US007492950B2

(12) United States Patent
Suzuki et al.

(10) Patent No.: US 7,492,950 B2
(45) Date of Patent: Feb. 17, 2009

(54) IMAGE ENCODING APPARATUS AND METHOD FOR HANDLING INTRA-IMAGE PREDICTIVE ENCODING WITH VARIOUS COLOR SPACES AND COLOR SIGNAL RESOLUTIONS

(75) Inventors: Teruhiko Suzuki, Chiba (JP); Akira Sugiyama, Kanagawa (JP); Kyohei Koyabu, Kanagawa (JP)

(73) Assignee: Sony Corporation, Tokyo (JP)

( * ) Notice: Subject to any disclaimer, the term of this patent is extended or adjusted under 35 U.S.C. 154(b) by 447 days.

(21) Appl. No.: 10/527,922

(22) PCT Filed: Jul. 20, 2004

(86) PCT No.: PCT/JP2004/010317

§ 371 (c)(1),
(2), (4) Date: Mar. 16, 2005

(87) PCT Pub. No.: WO2005/009050

PCT Pub. Date: Jan. 27, 2005

(65) Prior Publication Data

US 2005/0271288 A1    Dec. 8, 2005

(30) Foreign Application Priority Data

Jul. 18, 2003    (JP) ............................. 2003-277128

(51) Int. Cl.
*G06K 9/36* (2006.01)
(52) U.S. Cl. ....................................... 382/232
(58) Field of Classification Search ................. 382/239, 382/232
See application file for complete search history.

(56) References Cited

U.S. PATENT DOCUMENTS 3,679,821 A * 7/1972 Schroeder .............. 375/240.12

(Continued)

FOREIGN PATENT DOCUMENTS

JP    8-336163    12/1996

(Continued)

OTHER PUBLICATIONS

Video Coding Experts Group (VCEG). H. 26L Test Model Long Term No. 6 (TML-6) draftO. [online]. 2001. pp. 1, 11-18 [retrieved on Aug. 1, 2003]. Retrieved from the Internet: <URL:http://kbs.cs.tu-berlin.de/~stewe/vceg/archive.htm#TML6.

*Primary Examiner*—Vikkram Bali
*Assistant Examiner*—Eueng-Nan Yeh
(74) *Attorney, Agent, or Firm*—Finnegan, Henderson, Farabow, Garrett & Dunner, L.L.P.

(57) ABSTRACT

The present invention is directed to an image information encoding apparatus adapted for performing intra-image encoding based on resolution of color components and color space of an input image signal. An intra prediction unit serves to adaptively change block size in generating a prediction image based on a chroma format signal indicating whether resolution of color components is one of 4:2:0 format, 4:2:2 format, and 4:4:4 format, and a color space signal indicating whether color space is one of YCbCr, RGB, and XYZ. An orthogonal transform unit and a quantization unit serve to also change orthogonal transform technique and quantization technique in accordance with the chroma format signal and the color space signal. A reversible encoding unit encodes the chroma format signal and the color space signal to include the encoded signals into image compressed information.

11 Claims, 12 Drawing Sheets

U.S. PATENT DOCUMENTS

| | | | |
|---|---|---|---|
| 6,192,188 B1 * | 2/2001 | Dierke | 386/95 |
| 6,360,016 B1 * | 3/2002 | Shen et al. | 382/238 |
| 6,608,935 B2 * | 8/2003 | Nagumo et al. | 382/233 |
| 2003/0081852 A1 * | 5/2003 | Pohjola | 382/253 |
| 2003/0093452 A1 * | 5/2003 | Zhou | 708/520 |

FOREIGN PATENT DOCUMENTS

| | | |
|---|---|---|
| JP | 11-262003 | 9/1999 |
| JP | 2000-23190 | 1/2000 |
| JP | 2001-199818 | 7/2001 |
| JP | 2002-020953 | 1/2002 |
| JP | 2003-023637 | 1/2003 |

* cited by examiner

IMAGE ENCODING APPARATUS AND METHOD FOR HANDLING INTRA-IMAGE PREDICTIVE ENCODING WITH VARIOUS COLOR SPACES AND COLOR SIGNAL RESOLUTIONS

TECHNICAL FIELD

The present invention relates to an image information encoding apparatus and a method therfor, and an image information decoding apparatus and a method therfor, which are used in receiving, through network media such as satellite broadcasting service, cable TV (television) or Internet, etc., or in processing, on storage or memory media such as optical disc, magnetic disc or flash memory, etc., image compressed information (bit stream) compressed by orthogonal transform such as discrete cosine transform or Karhunen-Loeve transform, etc. and motion prediction/compensation like MPEG (Moving Picture Experts Group), H. 26x, etc.

This Application claims priority of Japanese Patent Application No. 2003-277128, field on Jul. 18, 2003, the entirety of which is incorporated by reference herein.

BACKGROUND ART

In recent years, apparatuses in conformity with the system such as MPEG in which image information are dealt as digital information to compress such image information by orthogonal transform such as discrete cosine transform, etc. and motion prediction/compensation by utilizing redundancy specific to image information for the purpose of realizing transmission/storage of information having high efficiency in that instance are being popularized at both information distribution (delivery) at broadcasting station, etc. and information reception in general homes.

Particularly, the MPEG2 (ISO/IEC 13818-2) is defined as general purpose image encoding system, and is widely used at present in broad application for professional use purpose and consumer use purpose at the standard where both interlaced scanning image and sequential scanning image, and standard resolution image and high definition image are covered. By using the MPEG2 compression system, in the case of interlaced scanning image of the standard resolution having, e.g., 720×480 pixels, code quantity (bit rate) of 4 to 8 Mbps is assigned, and in the case of interlaced scanning image of high resolution having 1920×1088 pixels, code quantity (bit rate) of 18 to 22 Mbps is assigned so that high compression factor and satisfactory picture quality can be realized.

The MPEG2 is mainly directed to high picture quality encoding adapted mainly to encoding system for broadcast, but did not comply with encoding system having code quantity (bit rate) lower than that of the MPEG1, i.e., compression factor higher than that. However, it is deemed that needs of such encoding system will be increased in future with popularization of portable (mobile) terminals. In correspondence therewith, standardization of the MPEG4 encoding system has been performed. In connection with the image encoding system, its standard has been approved as the International Standard as ISO/IEC 14496-2 on December, 1998.

Further, in recent years, with realization of image encoding for television conference being as the object in the beginning, standardization of H.264 (ITU-TQ6/16 VCEG) is being developed. It is known that while the H.264 requires a larger number of operation quantities for encoding/decoding thereof as compared to the conventional encoding system such as MPEG2 or MPEG4, higher encoding efficiency can be realized. In addition, standardization in which functions which cannot be supported by H.264 are also taken in with the H.264 being as base to realize higher encoding efficiency is being performed at present by JVT (Joint Video Team) as a part of activity of the MPEG4.

Here, outline of the configuration of an image information encoding apparatus adapted for realizing image compression by orthogonal transform such as discrete cosine transform or Karhnen-Loueve transform, etc. and motion prediction/compensation is shown in FIG. 1. As shown in FIG. 1, the image information encoding apparatus 100 comprises an A/D (Analogue/Digital) converting unit 101, an image sorting buffer 102, an adder 103, an orthogonal transform unit 104, a quantization unit 105, a reversible encoding unit 106, a storage buffer 107, an inverse quantization unit 108, an inverse orthogonal transform unit 109, an adder 110, a frame memory 111, a motion prediction/compensation unit 112, an intra prediction unit 113, and a rate control unit 114.

In FIG. 1, the A/D converting unit 101 converts an inputted image signal into a digital signal. The image sorting buffer 102 performs sorting of frames in accordance with GOP (Group of Pictures) structure of image compressed information outputted from the image information encoding apparatus 100.

In this example, the image sorting buffer 102 delivers image information of the entirety of frames to the orthogonal transform unit 104 in regard to images in which intra (intra-image) encoding is performed. The orthogonal transform unit 104 implements orthogonal transform such as discrete cosine transform or Karhnen-Loueve transform, etc. to image information to deliver transform coefficients to the quantization unit 105. The quantization unit 105 implements quantization processing to the transform coefficients which have been delivered from the orthogonal transform unit 104.

The reversible encoding unit 106 implements reversible encoding such as variable length encoding or arithmetic encoding, etc. to the quantized transform coefficients to deliver the encoded transform coefficients to the storage buffer 107 to store them thereinto. The encoded transform coefficients thus obtained are outputted as image compressed information.

The behavior (operation) of the quantization unit 105 is controlled by the rate control unit 114. Moreover, the quantization unit 105 delivers quantized transform coefficients to the inverse quantization unit 108. The inverse quantization unit 108 inverse-quantizes the transform coefficients thus delivered. The inverse orthogonal transform unit 109 implements inverse orthogonal transform processing to the inverse-quantized transform coefficients to generate decoded image information to deliver the information thus generated to the frame memory 111 to store them thereinto.

On the other hand, the image sorting buffer 102 delivers image information to the motion prediction/compensation unit 112 in regard to images in which inter (inter-image) encoding is performed. The motion prediction/compensation unit 112 takes out image information referred at the same time from the frame memory 111 to implement motion prediction/compensation processing thereto to generate reference image information. The motion prediction/compensation unit 112 delivers the reference image information thus generated to the adder 103. The adder 103 converts the reference image information into a difference signal between the reference image information and the image information thus delivered. In addition, the motion compensation/prediction unit 112 delivers motion vector information to the reversible encoding unit 106 at the same time.

The reversible encoding unit 106 implements reversible encoding processing such as variable length encoding or arithmetic encoding, etc. to the motion vector information thus delivered to form information inserted into the header portion of the image compressed information. It is to be noted that since other processing are the same as those of image compressed information to which intra-encoding is implemented, their explanation will be omitted.

Here, in the encoding system in which standardization is performed by the above-described JVT (hereinafter referred to as JVT Codec), there is employed intra-predictive encoding such that predictive images are generated from pixels around block in performing intra-encoding to encode difference therebetween. Namely, in regard to images in which intra-encoding is performed, prediction images are generated from pixel values in which encoding has been already completed in the vicinity of pixel block to be encoded so that differences with respect to the predictive images thereof are encoded. The inverse quantization unit 108 and the inverse orthogonal transform unit 109 respectively inverse-quantize and inverse-orthogonally transform intra-encoded pixels. The adder 110 adds output of the inverse orthogonal transform unit 109 and prediction images used in encoding pixel block corresponding thereto to deliver the added values thus obtained to the frame memory 111 to store them thereinto. In the case of pixel block to be intra-encoded, the intra prediction unit 113 reads out already encoded neighboring pixels stored in the frame memory 111 to generate prediction image. At this time, also with respect to the intra-prediction mode used for generation of prediction image, reversible encoding processing is implemented thereto at the reversible encoding unit 106 to output information thus processed in the state included into image compressed information.

Subsequently, outline of the configuration of an image information decoding apparatus corresponding to the above-described image information encoding apparatus 100 is shown in FIG. 2. The image information decoding apparatus 120 comprises, as shown in FIG. 2, a storage buffer 121, a reversible decoding unit 122, an inverse quantization unit 123, an inverse orthogonal transform unit 124, an adder 125, an image sorting buffer 126, a D/A (Digital/Analogue) converting unit 127, a motion prediction/compensation unit 128, a frame memory 129, and an intra-prediction unit 130.

In FIG. 2, the storage buffer 121 temporarily stores inputted image compressed information thereafter to transfer the image compressed information to the reversible decoding unit 122. The reversible decoding unit 122 implements processing such as variable length decoding or arithmetic decoding, etc. to the image compressed information on the basis of a predetermined format for image compressed information to deliver quantized transform coefficients to the inverse quantization unit 123. Moreover, in the case where corresponding frame is inter-encoded frame, the reversible decoding unit 122 also decodes motion vector information stored at the header portion of the image compressed information to deliver the information thus decoded to the motion prediction/compensation unit 128.

The inverse quantization unit 123 inverse-quantizes quantized transform coefficients delivered from the reversible decoding unit 122 to deliver the transform coefficients thus obtained to the inverse orthogonal transform unit 124. The inverse orthogonal transform unit 124 implements inverse orthogonal transform such as inverse discrete cosine transform or inverse Karhunen-Loeve transform, etc. to the transform coefficients on the basis of a predetermined format for image compressed information.

Here, in the case where corresponding frame is intra-encoded frame, the image information to which inverse orthogonal transform processing has been implemented are stored into the image sorting buffer 126, and are outputted after D/A converting processing at the D/A converting unit 127.

On the other hand, in the case where corresponding frame is inter-encoded frame, the motion prediction/compensation unit 128 generates reference image on the basis of motion vector information to which reversible decoding processing has been implemented and image information stored in the frame memory 129 to deliver the reference image thus generated to the adder 125. The adder 125 synthesizes the reference image and output of the inverse orthogonal transform unit 124. It is to be noted that since other processing are the same as those of the intra-encoded frame, their explanation will be omitted.

In this example, since the intra-predictive encoding system is employed in the JVT Codec, in the case where corresponding frame is intra-encoded frame, the intra-prediction unit 130 reads out image from the frame memory 129 to generate prediction image in accordance with intra-prediction mode to which reversible decoding processing has been implemented at the reversible decoding unit 122. The adder 125 adds output of the inverse orthogonal transform unit 124 and this prediction image.

The image information encoding apparatus 100 and the image information decoding apparatus 120 which have been explained above are disclosed in, e.g., Published Japanese Patent Application No. 2003-023637 publication.

Meanwhile, in the JVT Codec (H. 264|MPEG-4 AVC), as described above, in performing intra-encoding processing, there is employed such an intra predictive encoding system to generate prediction images from pixels around block to encode differences therebetween.

Here, in regard to luminance component, there are used two prediction systems of intra 4×4 prediction mode where prediction is performed on 4×4 pixel block basis and intra 16×16 prediction mode where prediction is performed on 16×16 pixel block. (macro block) basis.

On the other hand, in regard to color difference components, predictions are performed on Cb, Cr respective 8×8 block basis. This predictive encoding method is the same as that in the intra 16×16 prediction mode, wherein this prediction mode is changed into the prediction mode of 8×8 block units. The prediction mode in the intra-predictive encoding of color difference is shown in FIG. 3. As shown in FIG. 3, at the JVT Codec, four prediction modes of (a) Vertical mode (mode=0)

(b) Horizontal mode (mode=1)

(c) DC mode (mode=2)

(d) Plane Prediction mode (mode=3)

are defined. In accordance with prediction mode having least predictive difference (residual), prediction image is generated. The technique of generating prediction image in these four prediction modes will be explained below.

(a) Vertical mode (mode=0)

In the Vertical mode, pixels of adjacent upper side block of color difference block (in the case of 4:2:0 format, upper macro block) of color difference block are copied to allow the pixels thus copied to be prediction image of corresponding block. When pixels of adjacent upper side block are expressed as p[x, −1], prediction image predc of the color difference block in this case is represented by the following formula (1). It is to be noted that this mode can be used only in the case where adjacent upper side block exists.

[1]

$$pred_c[x, y] = p[x, -1] (x, y = 0 \ldots 7) \quad (1)$$

(b) Horizontal mode (mode=1)

In the Horizontal mode, pixels of adjacent left side block of color difference block (in the case of 4:2:0 format, left macro block) are copied to allow the pixels thus copied to be prediction image of corresponding block. When pixels of adjacent left side block are expressed as p[−1, y], prediction image predc of the color difference block in this case is represented by the following formula (2). It is to be noted that this mode can be used only in the case where adjacent left side block exists.

[2]

$$pred_c[x, y] = p[-1, y] (x, y = 0 \ldots 7) \quad (2)$$

(c) DC mode (mode=2)

In the DC mode, pixels of adjacent upper and left side blocks of color difference block are used to allow the mean (average) value thereof to be prediction image. It is to be noted that in the case where adjacent pixels do not exist, value 128 is used as prediction signal.

Namely, in the case of x, y=0 . . . 3, prediction image predc [x, y] is generated by using upper side pixel p[x, −1] and left side pixel p[−1, y] which are adjacent (in this example, x, y= 0 . . . 3). More particularly, in four cases of the case (i) where pixel p[x, −1] and pixel p[−1, y] both exist, (ii) the case where pixel p[x, −1] exists and pixel p[−1, y] does not exist, (iii) the case where pixel p[x, −1] does not exist and pixel p[−1, y] exists, and (iv) the case where pixel p[x, −1] and pixel p[−1, y] do not both exist, prediction images are respectively generated in accordance with the following formulas (3) to (6).

[3]

$$pred_c[x, y] = \left( \sum_{x'=0}^{3} p[x', -1] + \sum_{y'=0}^{3} p[-1, y'] + 4 \right) >> 3 \; (x, y = 0..3) \quad (3)$$

$$pred_c[x, y] = \left( \sum_{x'=0}^{3} p[x', -1] + 2 \right) >> 2 \; (x, y = 0..3) \quad (4)$$

$$pred_c[x, y] = \left( \sum_{y'=0}^{3} p[-1, y'] + 2 \right) >> 2 \; (x, y = 0..3) \quad (5)$$

$$pred_c[x, y] = 128 \; (x, y = 0..3) \quad (6)$$

Similarly, in the case of x=4 . . . 7, y=0 . . . 3, prediction image predc [x, y] is generated by using upper side pixel p[x, −1] and left side pixel p[−1, y] which are adjacent (in this example, x=4 . . . 7, y=0 . . . 3). More particularly, in three cases of (i) the case where pixel p[x, −1] exists, (ii) the case where pixel p[x, −1] does not exist and pixel p[−1, y] exists, and (iii) the case where pixel p[x, −1] and pixel p[−1, y] do not both exist, prediction images are respectively generated in accordance with the following formulas (7) to (9).

[4]

$$pred_c[x, y] = \left( \sum_{x'=4}^{7} p[x', -1) + 2 \right) >> 2 \; (x = 4..7, y = 0..3) \quad (7)$$

$$pred_c[x, y] = \left( \sum_{y'=0}^{3} p[-1, y'] + 2 \right) >> 2 \; (x = 4..7, y = 0..3) \quad (8)$$

$$pred_c = 128 \; (x = 4..7, y = 0..3) \quad (9)$$

Similarly, in the case of x=0 . . . 3, y=4 . . . 7, prediction image predc [x, y] is generated by using upper side pixel p[x, −1] and left side pixel p[−1, y] which are adjacent (in this example, x=0 . . . 3, y=4 . . . 7). More particularly, in three cases of (i) the case where pixel p[−1, y] exists, (ii) the case where pixel p[x, −1] exists and pixel p [−1, y] does not exist, and (iii) the case where pixel p[x, −1] and pixel p[−1, y] do not both exist, prediction images are respectively generated in accordance with the following formulas (10) to (12).

[5]

$$pred_c[x, y] = \left( \sum_{y'=4}^{7} p[-1, y'] + 2 \right) >> 2 \; (x = 0..3, y = 4..7) \quad (10)$$

$$pred_c[x, y] = \left( \sum_{x'=0}^{3} p[x', -1] + 2 \right) >> 2 \; (x = 0..3, y = 4..7) \quad (11)$$

$$pred_c = 128 \; (x = 0..3, y = 4..7) \quad (12)$$

Similarly, in the case of x, y=4 . . . 7, prediction image predc [x, y] is generated by using upper side pixel p[x, −1] and left side pixel p[−1, y] which are adjacent (in this example, x, y= 4 . . . 7). More particularly, in four cases of (i) the case where pixel p[x, −1] and pixel p[−1, y] both exist, (ii) the case where pixel p[x, −1] exists and pixel p[−1, y] does not exist, (iii) the case where pixel p[x, −1] does not exist and pixel p[−1, y] exists, and (iv) the case where pixel p[x, −1] and pixel p[−1, y] do not both exist, prediction images are respectively generated in accordance with the following formulas (13) to (16).

[6]

$$pred_c[x, y] = \left( \sum_{x'=4}^{7} p[x', -1] + \sum_{y'=4}^{7} p[-1, y'] + 4 \right) >> 3 \; (x, y = 4..7) \quad (13)$$

$$pred_c[x, y] = \left( \sum_{x'=4}^{7} p[x', -1] + 2 \right) >> 2 \; (x, y = 4..7) \quad (14)$$

$$pred_c[x, y] = \left( \sum_{y'=4}^{7} p[-1, y'] + 2 \right) >> 2 \; (x, y = 4..7) \quad (15)$$

$$pred_c[x, y] = 128 \; (x, y = 4..7) \quad (16)$$

(d) Plane Prediction mode (mode=3)

In the Plane Prediction mode, prediction image is plane-approximated from pixel of left side block (left macro block in the case of 4:2:0 format) and pixel of upper side block which are adjacent of color difference block to allow the prediction image thus obtained to be prediction image of corresponding block. When pixel of left side block and pixel of upper side block which are adjacent are respectively expressed as p[−1, y] and p[x, −1], prediction image predc of color difference in this case is represented by the following formula (17). Here, Clip1 indicates that clipping into the range from 0 to 255 is performed.

[7]

$$pred_c[x,y] = Clip1((a+b \times (x-3)+c \times (y-3)+16)>>5)(x, y=0..7) \quad (17)$$

where $$\begin{cases} a = 16 \times (p[-1, 7] + p[7, -1]) \\ b = (17 \times H + 16) >> 5 \\ c = (17 \times V + 16) >> 5 \\ H = \sum_{x'=0}^{3} (x' + 1) \times (p[4 + x', -1] - p[2 - x', -1]) \\ V = \sum_{y'=0}^{3} (y' + 1) \times (p[-1, 4 + y'] - p[-1, 2 - y']) \end{cases}$$

In a manner as stated above, after intra-prediction of color difference component is performed by any one of the four prediction modes to generate prediction image, a difference signal between current pixel block and the prediction image is generated at the adder 103. The orthogonal transform unit 104 applies 4×4 integral transform to the difference signal of 8×8 blocks on 4×4 pixel block basis. When a difference signal obtained by subtracting prediction image from current pixel block is expressed as F4×4, 4×4 integral transform is represented by the following formula (18).

[8]

$$f_{4 \times 4} = T_{4 \times 4} \times F_{4 \times 4} \times T_{4 \times 4}^T \quad (18)$$

where $$T_{4 \times 4} = \begin{pmatrix} 1 & 1 & 1 & 1 \\ 2 & 1 & -1 & -2 \\ 1 & -1 & -1 & 1 \\ 1 & -2 & 2 & -1 \end{pmatrix}$$

Further, in the JVT Codec, after 4×4 integral transform is performed, (0, 0) coefficients (DC coefficients) of four 4×4 blocks within 8×8 blocks are collected to constitute 2×2 blocks as shown in FIG. 4 to apply 2×2 Hadamard transform to the 2×2 blocks. This is because efficiency of intra-prediction used in color difference is not so high, and correlation is still left between (0, 0) coefficients of adjacent 4×4 blocks. In order to enhance (increase) encoding efficiency to more degree by utilizing this correlation, only (0, 0) coefficients of 4×4 blocks are collected to constitute 2×2 blocks to apply 2×2 Hadamard transform thereto. When chroma DC block of 2×2 is expressed as fdc2×2, chroma DC block fdc' 2×2 after undergone 2×2 Hadamard transform is represented by the following formula (19).

[9]

$$fdc'_{2 \times 2} = T_{2 \times 2} \times fdc_{2 \times 2} \times T_{2 \times 2}^T \quad (19)$$

where $$T_{2 \times 2} = \frac{1}{\sqrt{2}} \begin{pmatrix} 1 & 1 \\ 1 & -1 \end{pmatrix}$$

After integral transform processing, respective coefficients are quantized. When parameter for determining quantization coefficients of luminance is QPy, parameter QPc for determining quantization coefficients of color difference is calculated in a manner as described below.

Namely, first, QPy (which takes value ranging from 0 to 51) to be encoded in image compressed information and offset value chroma_qp_offset of quantization coefficients of color difference are used to calculate parameter QPi in accordance with the following formula (20). In this case, QPi is caused to undergo clipping into the range from 0 to 51.

[10]

$$QPi = QPy + chroma\_qp\_offset \quad (20)$$

Further, this QPi is used to determine parameter QPc of color difference from the Table 1 shown as below.

TABLE 1

| $QP_i$ | <30 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
|---|---|---|---|---|---|---|---|---|---|---|---|---|---|---|---|---|---|---|---|---|---|---|---|
| $QP_c$ | =$QP_i$ | 29 | 30 | 31 | 32 | 32 | 33 | 34 | 34 | 35 | 35 | 36 | 36 | 37 | 37 | 37 | 38 | 38 | 38 | 39 | 39 | 39 | 39 |

Here, when values of respective AC coefficients before quantization are f, and values of respective AC coefficients after quantization are f', values of quantized coefficients are represented by the following formula (21).

[11]

$$f'[i,j] = (f[i,j] \times Q(QP_c\%6, i, j) + r) >> (15 + QP_c/6)(i, j = 0 \ldots 3) \quad (21)$$

where $$\begin{cases} Q(QP\%6, i, j) = quantMat[QP\%6][0], \ (i, j) \in \{(0, 0), (0, 2), (2, 0), (2, 2)\} \\ \qquad\qquad\qquad = quantMat[QP\%6][1], \ (i, j) \in \{(1, 1), (1, 3), (3, 1), (3, 3)\} \\ \qquad\qquad\qquad = quantMat[QP\%6][2], \text{ otherwise} \\ quantMat[6][3] = \begin{bmatrix} 13107 & 5243 & 8224 \\ 11651 & 4660 & 7358 \\ 10486 & 4143 & 6554 \\ 9198 & 3687 & 5825 \\ 8322 & 3290 & 5243 \\ 7384 & 2943 & 4660 \end{bmatrix} \end{cases}$$

On the other hand, when values of respective DC coefficients before quantization are fdc, and values of respective DC coefficients after quantization are fdc', values of quantized coefficients are represented by the following formula (22). In this case, r in the formula (22) is constant for rounding processing.

[12]

$$fdc'[i,j]=(fdc[i,j]\times Q(QP_c\%6,0,0))>>(16+QP_c/6)(i,j=0\ldots 1) \quad (22)$$

Moreover, when AC coefficients after inverse quantization are f", inverse quantization of AC coefficients is represented by the following formula (23).

[13]

$$f''[i,j]=(f'[i,j]\times IQ(QP_c\%6,i,j)+r)<<(QP_c/6)(i,j=0\ldots 3) \quad (23)$$

where $$\begin{cases} IQ(QP\%6, i, j) = iquantMat[QP\%6][0], (i, j)\in\{(0, 0), (0, 2), (2, 0), (2, 2)\} \\ \qquad\qquad\qquad = iquantMat[QP\%6][1], (i, j)\in\{(1, 1), (1, 3), (3, 1), (3, 3)\} \\ \qquad\qquad\qquad = iquantMat[QP\%6][2], \text{otherwise} \\ iquantMat[6][3] = \begin{bmatrix} 10 & 16 & 13 \\ 11 & 18 & 14 \\ 13 & 20 & 16 \\ 14 & 23 & 18 \\ 16 & 25 & 20 \\ 18 & 29 & 23 \end{bmatrix} \end{cases}$$

On the other hand, when inverse-quantized DC coefficients are fdc", inverse quantization of DC coefficients is represented by the following formula (24) in the case where QPc is 6 (six) or more, and is represented by the following formula (25) in the case where QPc is less than 6 (six).

[14]

$$fdc''[i,j]=('[i,j]\times IQ(QP_c\%6,i,j))<<(QP_c/6-1)(i,j=0\ldots 3) \quad (24)$$

$$fdc''[i,j]=(fdc'[i,j]\times IQ(QP_c\%6,i,j))>>)i,j=0\ldots 3) \quad (25)$$

While intra-predictive encoding processing is performed in the JVT Codec in a manner as stated above, there was the problem that even if the above-mentioned technique is used, since block size is small in the intra-predictive encoding of color difference, encoding efficiency is inferior as compared to luminance.

In addition, there was the problem that the above-mentioned technique only complies with 4:2:0 format and YCbCr color space, so encoding cannot be performed in the case of 4:2:2 format, 4:4:4 format, RGB color space, XYZ color space, etc.

DISCLOSURE OF THE INVENTION

Problems to be Solved by the Invention

The present invention has been proposed in view of conventional actual circumstances as described above, and its object is to provide an image information encoding apparatus and a method therefor, and an image information decoding apparatus and a method therefor, which can more efficiently perform encoding/decoding of even images of 4:2:2 format, 4:4:4 format, RGB color space and/or XYZ color space, etc.

Means for Solving the Problems

The image information encoding apparatus according to the present invention is directed to an image information encoding apparatus adapted for blocking an input image signal to implement orthogonal transform thereto on the block basis to perform quantization, which comprises: intra-image prediction means for adaptively changing block size on the basis of a chroma format signal indicating resolution of a color signal and a color space signal indicating color space to generate a prediction image in performing intra-image predictive encoding of the color signal; transform means for performing, on a predetermined block size basis, integral transform of a difference signal between the prediction image generated by the intra-image prediction means and an original image; quantization means for adaptively changing quantization technique in accordance with transform processing by the transform means to quantize transform coefficients generated by the transform means; and encoding means for encoding the transform coefficients quantized by the quantization means, the chroma format signal and the color space signal.

Moreover, the image information encoding method according to the present invention is directed to an image information encoding method of blocking an input image signal to implement orthogonal transform thereto on the block basis to perform quantization, which comprises: an intraimage prediction step of adaptively changing block size on the basis of a chroma format signal indicating resolution of a color signal and a color space signal indicating color space to generate a prediction image in performing intra-image predictive encoding of the color signal; a transform step of performing, on a predetermined block size basis, integral transform processing of a difference signal between the prediction image generated at the intra-image prediction step and an original image; a quantization step of adaptively changing quantization technique in accordance with transform processing at the transform step to quantize transform coefficients generated at the transform step; and an encoding step of encoding the transform coefficients quantized at the quantization step, the chroma format signal and the color space signal.

In such image information encoding apparatus and method therefor, in performing intra-image predictive encoding of input image signal, block size in generating prediction image is adaptively changed on the basis of chroma format signal indicating whether resolution of color component is that of any one of 4:2:0 format, 4:2:2 format and 4:4:4 format, etc., and color space signal indicating whether color space is any one of, e.g., YCbCr, RGB and XYZ, etc. Further, in the image information encoding apparatus and the method therefor, chroma format signal and color space signal are encoded along with quantized transform coefficients.

Further, the image information decoding apparatus according to the present invention is directed to an image information decoding apparatus adapted for decoding information obtained by implementing inverse quantization and inverse orthogonal transform to image compressed information in which an input image signal is blocked to implement orthogonal transform thereto on the block basis so that quantization is performed with respect thereto, which comprises: decoding means for decoding quantized and encoded transform coefficients, a chroma format signal indicating resolution of a color signal and a color space signal indicating color space; inverse quantization means for adaptively changing inverse quantization technique in accordance with the chroma format signal and the color space signal to inverse-quantize the transform coefficients decoded by the decoding means; inverse transform means for performing integral transform of the inverse-quantized blocks; and intraimage prediction means for generating a prediction image in performing intraimage predictive decoding of the color signal at a block size corresponding to the chroma format signal and the color space signal by using an output signal from the inverse transform means.

In addition, the image information decoding method according to the present invention is directed to an image information decoding method of decoding information obtained by implementing inverse quantization and inverse orthogonal transform to image compressed information in which an input image signal is blocked to implement orthogonal transform thereto on the block basis so that quantization is performed with respect thereto, which comprises: a decoding step of decoding quantized and encoded transform coefficients, a chroma format signal indicating resolution of a color signal and a color space signal indicating color space; an inverse quantization step of adaptively changing inverse quantization technique in accordance with the chroma format signal and the color space signal to inverse-quantize the transform coefficients decoded at the decoding step; an inverse transform step of performing integral transform of the inverse-quantized blocks; and an intra-image prediction step of generating a prediction image in performing intra-image predictive decoding of the color signal at a block size corresponding to the chroma format signal and the color space signal by using an output signal of the inverse transform step.

In such image information decoding apparatus and the method therefor, chroma format signal indicating whether resolution of color component is that of any one of, e.g., 4:2:0 format, 4:2:2 format and format 4:4:4 format, etc., and color space signal indicating whether color space is any one of, e.g., YCbCr, RGB, and XYZ, etc. are decoded to generate prediction image in performing intraimage predictive decoding of the color signal at a block size corresponding to the chroma format signal and the color space signal.

Effects/Advantages of the Invention

In accordance with the image information encoding apparatus and the method therefor, and the image information decoding apparatus and the method therefor according to the present invention, encoding/decoding can be efficiently performed by intra-image prediction not only in connection with the case of 4:2:0 format and YCbCr color space, but also in connection with 4:2:2 format, 4:4:4 format, RGB color space and/or XYZ color space, etc.

Still further objects of the present invention and practical merits obtained by the present invention will become more apparent from the description of the embodiments which will be given below with reference to the attached drawings.

BEST MODE FOR CARRYING OUT THE INVENTION

While practical embodiments to which the present invention is applied will now be described in detail with reference to the attached drawings, it should be noted that the present invention is not limited to such embodiments, but it is a matter of course that various changes or modifications can be made within the scope which does not depart from the gist of the present invention.

(1) Configuration and Operation of the Image Information Encoding Apparatus

Figure 1:
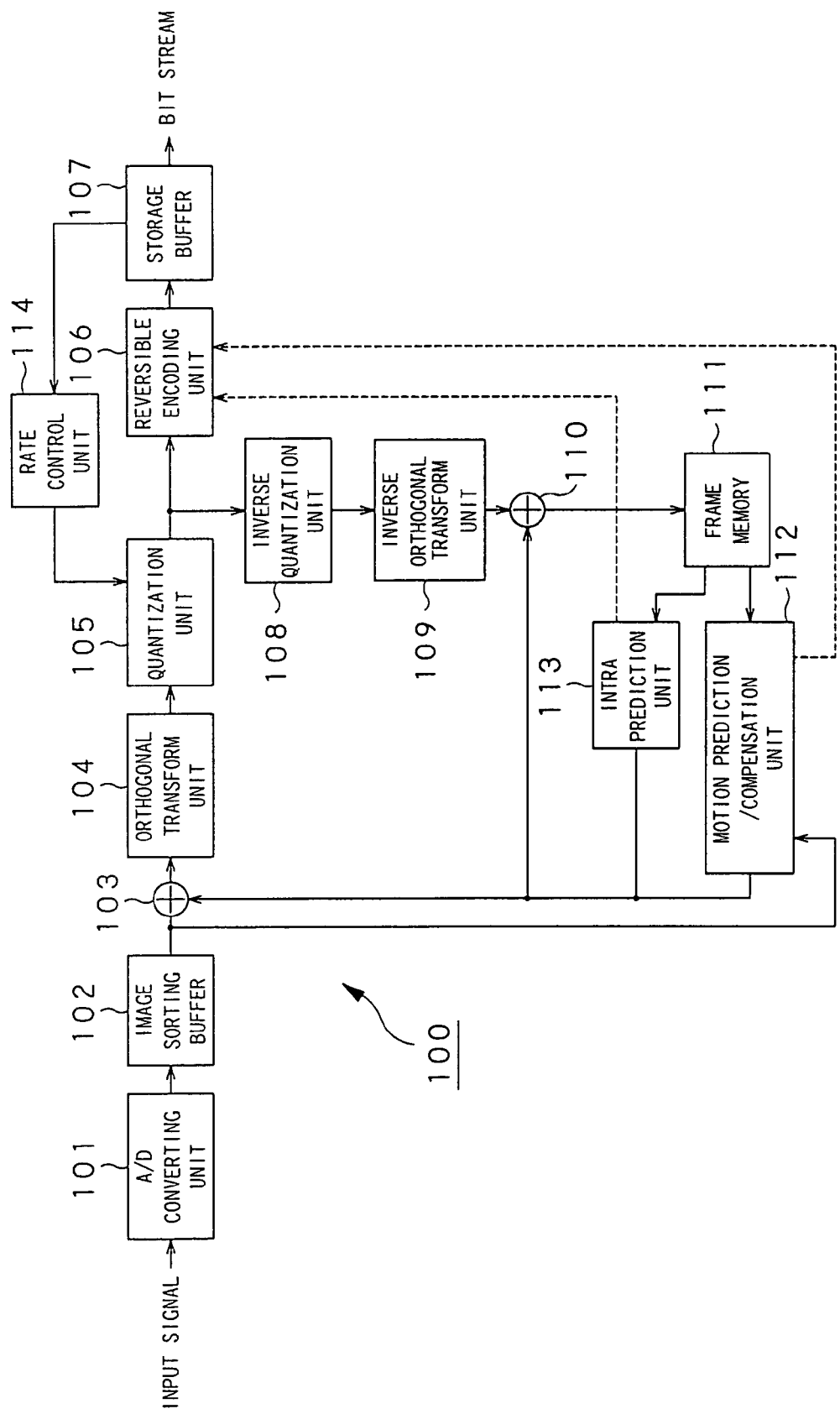
FIG. 1 is a block diagram showing outline of the configuration of a conventional image information encoding apparatus adapted for realizing image compression by orthogonal transform such as discrete cosine transform or Karhnen-Loeve transform, etc. and motion prediction/compensation.
Figure 2:
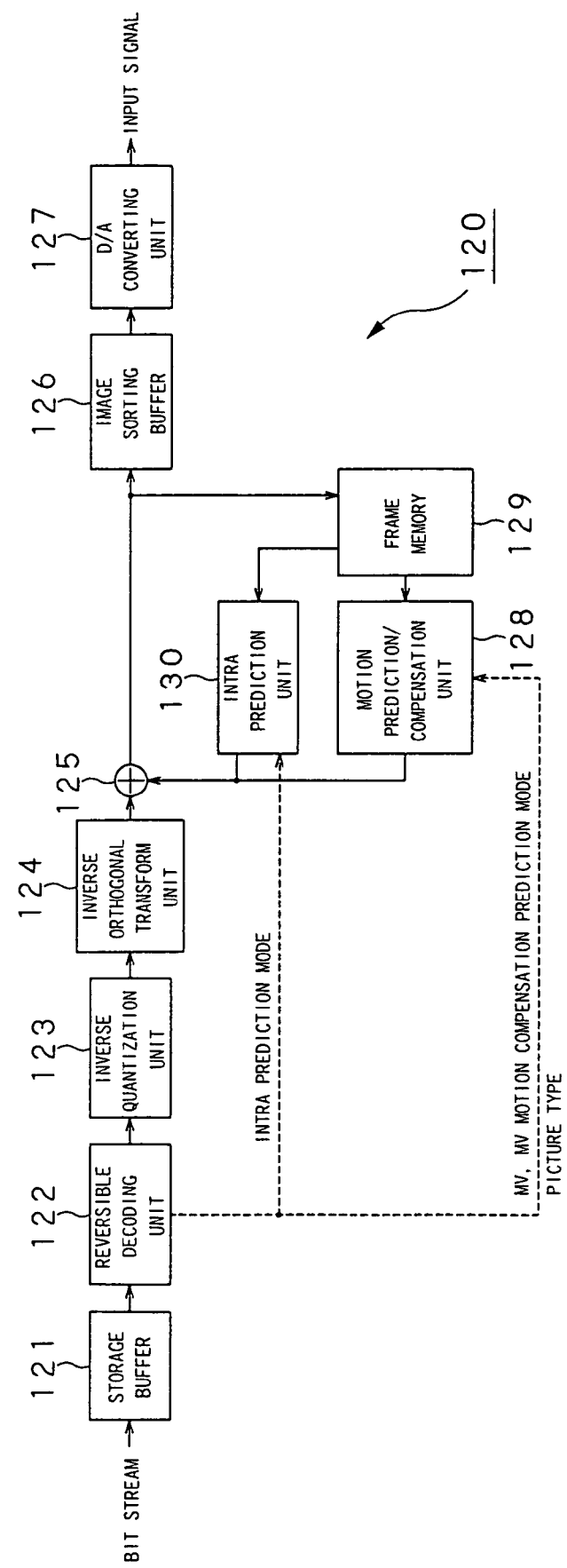
FIG. 2 is a block diagram showing outline of the configuration of a conventional image information decoding apparatus corresponding to the above-mentioned image information encoding apparatus.
Figure 3:
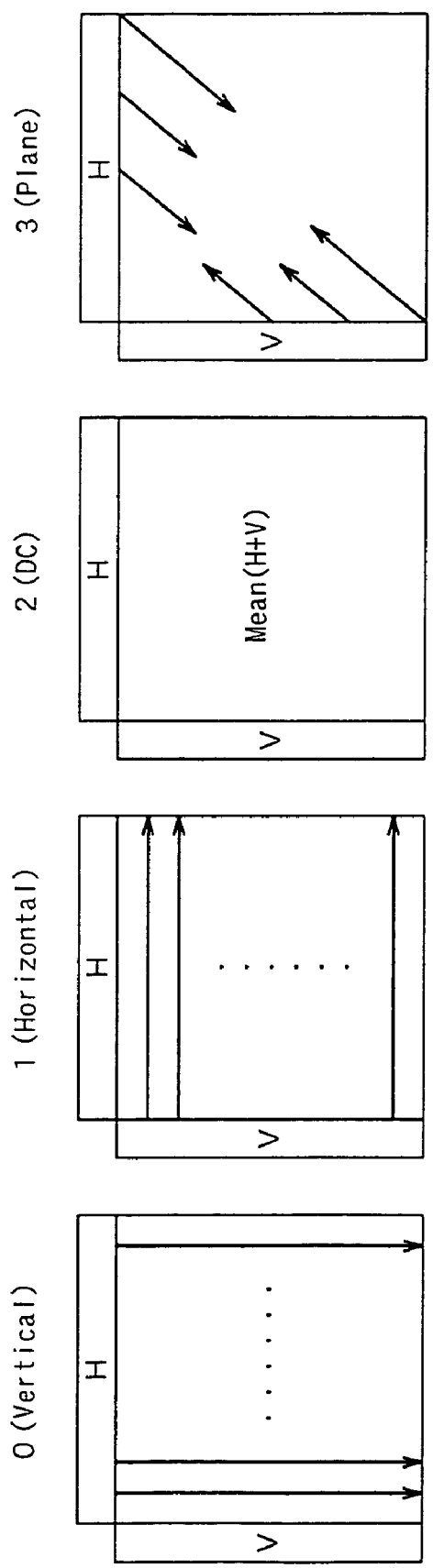
FIG. 3 is a view for explaining four intra-prediction modes in JVT Codec.
Figure 4:
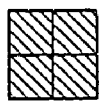
FIG. 4 is a view showing the state where DC coefficients of four 4×4 blocks within 8×8 block are collected to constitute 2×2 block.
Figure 4:
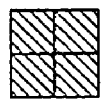
Figure 4:
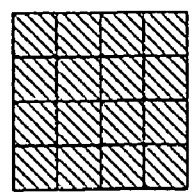
Figure 5:
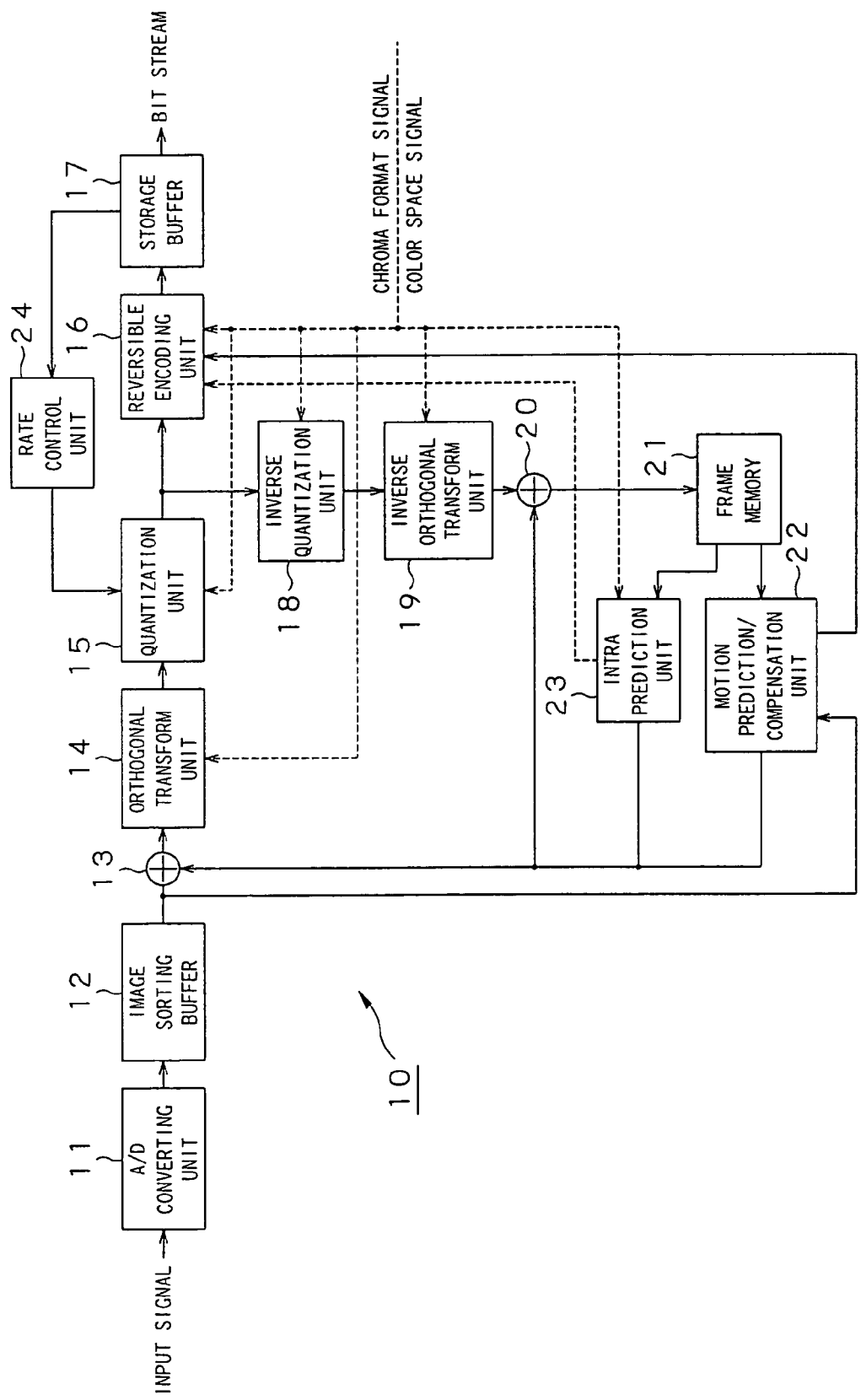
FIG. 5 is a block diagram showing outline of the configuration of an image information encoding apparatus according to the present invention.

First, outline of the configuration of the image information encoding apparatus according to the present invention is shown in FIG. 5. The image information encoding apparatus 10 comprises, as shown in FIG. 5, an A/D (Analogue/Digital) converting unit 11, an image sorting buffer 12, an adder 13, an orthogonal transform unit 14, a quantization unit 15, a reversible encoding unit 16, a storage buffer 17, an inverse quantization unit 18, an inverse orthogonal transform unit 19, an adder 20, a frame memory 21, a motion prediction/compensation unit 22, an intra-prediction unit 23, and a rate control unit 24.

In FIG. 5, the A/D converting unit 11 converts an inputted image signal into a digital signal. Further, the image sorting buffer 12 performs sorting of frames in accordance with GOP (Group of Pictures) structure of image compressed information outputted from the image information encoding apparatus 10. In this example, the image sorting buffer 12 delivers image information of the entirety of frames to the orthogonal transform unit 14 in regard to images in which intra (intra-image) encoding is performed. The orthogonal transform unit 14 implements orthogonal transform such as discrete cosine transform or Karhunen-Loeve transform, etc. to the image information to deliver transform coefficients to the quantization unit 15. The quantization unit 15 implements quantization processing to the transform coefficients delivered from the orthogonal transform unit 14.

The reversible encoding unit 16 implements reversible encoding such as variable length encoding or arithmetic encoding, etc. to the quantized transform coefficients to deliver the transform coefficients thus encoded to the storage buffer 17 to store them thereinto. The encoded transform coefficients are outputted as image compressed information.

The behavior (operation) of the quantization unit 15 is controlled by the rate control unit 24. Moreover, the quantization unit 15 delivers quantized transform coefficients to the inverse quantization unit 18. The inverse quantization unit 18 inverse-quantizes the transform coefficients thus delivered. The inverse orthogonal transform unit 19 implements inverse orthogonal transform processing to the inverse-quantized transform coefficients to generate decoded image information to deliver the information thus generated to the frame memory 21 to store them thereinto.

On the other hand, the image sorting buffer 12 delivers image information to the motion prediction/compensation unit 22 in regard to images in which inter (inter-image) encoding is performed. The motion prediction/compensation unit 22 takes out, from the frame memory 21, image information referred at the same time to implement motion prediction/compensation processing thereto to generate reference image information. The motion prediction/compensation unit 22 delivers the reference image information thus generated to the adder 13. The adder 13 converts the reference image information into a difference signal between the reference image information and corresponding image information. In addition, the motion compensation/prediction unit 22 delivers motion vector information to the reversible encoding unit 16 at the same time.

The reversible encoding unit 16 implements reversible encoding processing such as variable length encoding or arithmetic encoding, etc. to the motion vector information thus delivered to form information inserted into header portion of image compressed information. It is to be noted that since other processing are the same as those of image compressed information to which intra-encoding is implemented, the explanation thereof will be omitted.

In this example, in the above-described JVT Codec, in performing intra-encoding, there is employed intra-predictive encoding system of generating prediction images from pixels around block to encode differences therebetween. Namely, in regard to images in which intra-encoding is performed (I picture, I slice, intra macro block, etc.), prediction image is generated from already encoded pixel values in the vicinity of pixel block to be encoded so that difference with respect to the prediction image is encoded. The inverse quantization unit 18 and the inverse orthogonal transform unit 19 respectively inverse-quantize and inverse orthogonally transform the intra-encoded pixels. The adder 20 adds output of the inverse orthogonal transform unit 19 and prediction image used in encoding corresponding pixel block to deliver added value thus obtained to the frame memory 21 to store it thereinto. In the case of pixel block to be intra-encoded, the intra prediction unit 23 reads out already encoded neighboring pixels stored in the frame memory 21 to generate prediction image. At this time, also with respect to intra prediction mode used in generation of prediction image, reversible encoding processing is implemented thereto at the reversible encoding unit 16 to provide an output in the state included in image compressed information.

Figure 6:
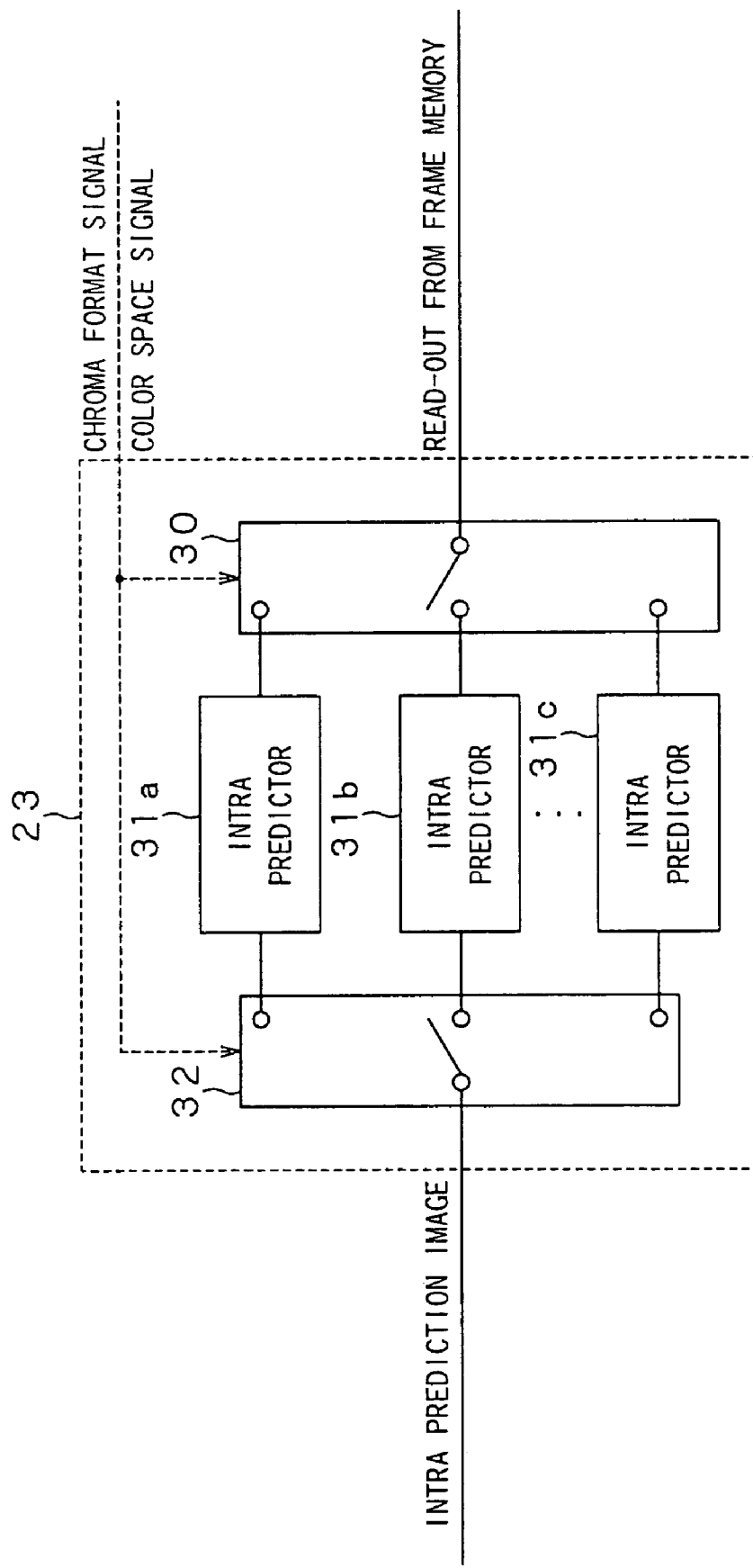
FIG. 6 is a block diagram showing one example of the configuration of intra-prediction unit in the image information encoding apparatus according to the present invention.

(2) The Part to Which the Present Invention is Applied in the Image Information Encoding Apparatus (2-1) Intra Prediction Unit An example of the configuration of the intra prediction unit 23 is shown in FIG. 6. The intra prediction unit 23 switches prediction technique on the basis of chroma format signal indicating whether resolution of color component is that of any one of 4:2:0 format, 4:2:2 format and 4:4:4 format, etc., and color space signal indicating whether color space is any one of YCbCr, RGB and XYZ, etc. In this example, the chroma format signal and the color space signal are set in advance by external user, etc., and are delivered to the image information encoding apparatus 10.

In the intra prediction unit 23 shown in FIG. 6, the chroma format signal and the color space signal are delivered to switches 30, 32. The switches 30 and 32 select any one of intra predictors 31a, 31b, 31c on the basis of the chroma format signal and the color space signal to deliver an image signal which has been read out from the frame memory 21 to the selected intra predictor to output prediction image from the selected intra predictor. The switches 30, 32 select the same intra predictor. It is to be noted that while explanation has been given in FIG. 6 on the premise that any one of three kinds of intra predictors 31a, 31b, 31c is selected, the number of intra predictors, i.e., the number of prediction systems may be arbitrarily set.

(2-1-1)

First, the operation of the intra predictor 31a will be explained. The intra predictor 31a serves to perform prediction with 8×8 block being as unit with respect to an image signal in which the chroma format signal indicates 4:2:0 format and color space signal indicates YCbCr. It is to be noted that since the operation of the intra predictor 31a is the same as that of the previously described prior art, the detailed explanation thereof is omitted.

(2-1-2)

Then, the operation of the intra predictor 31b will be explained. Also at the intra predictor 31b, four prediction modes of Vertical mode, Horizontal mode, DC mode and Plane prediction mode exist in the intra color difference prediction mode. The intra predictor 31b serves to perform prediction with 8×16 block constituted by collecting successive two 8×8 blocks in a longitudinal direction within macro block being as unit with respect to an image signal in which chroma format signal indicates 4:2:2 format and color space signal indicates YCbCr. The techniques of generating prediction images in accordance with respective four prediction modes at the intra predictor 31b will be explained below.

(a) Vertical Mode (Mode=0)

In the Vertical mode, pixels of adjacent upper side block of color difference block are copied to allow the pixels thus copied to be prediction image of corresponding block. When pixels of adjacent upper side block are expressed as p[x, −1], prediction image predc of color difference in this case is represented by the following formula (26). It is to be noted that this mode can be used only in the case where adjacent upper side block exists.

[15]

$$\mathrm{pred}_c[x,y]=p[x,-1](x=0\ldots 7, y=0\ldots 15) \qquad (26)$$

(b) Horizontal Mode (Mode=1)

In the Horizontal mode, pixels of adjacent left side block of color difference block are copied to allow the pixels thus copied to be prediction image of corresponding block. When pixels of adjacent left side block are expressed as p[−1, y], prediction image predc of the color difference block in this case is represented by the following formula (27). It is to be noted that this mode can be used only in the case where adjacent left side block exists.

[16]

$$\mathrm{pred}_c[x,y]=p[-1, y](x=0\ldots 7, y=0\ldots 15) \qquad (27)$$

(c) DC Mode (Mode=2)

In the DC mode, pixels of adjacent upper and left side blocks of color difference block are used to allow the mean (average) value thereof to be prediction image. It is to be noted that in the case where adjacent pixels do not exist, value 128 is used as prediction signal.

Namely, in the case of x, y=0 . . . 3, prediction image predc [x, y] is generated by using upper side pixel p[x, −1] and left side pixel p[−1, y] which are adjacent (in this example, x, y= 0 . . . 3). More particularly, in four cases of (i) the case where pixel p[x, −1] and p[−1, y] both exist, (ii) the case where pixel p[x, −1] exists and pixel p[−1, y] does not exist, (iii) the case where pixel p[x, −1] does not exist and pixel p[−1, y] exists, and (iv) the case where pixel p[x, −1] and pixel p[−1, y] do not both exist, prediction images are respectively generated in accordance with the following formulas (28) to (31).

[17]

$$pred_c[x, y] = \left(\sum_{x'=0}^{3} p[x', -1] + \sum_{y'=0}^{3} p[-1, y'] + 4\right) >> 3 \quad (x, y = 0..3) \quad (28)$$

$$pred_c[x, y] = \left(\sum_{x'=0}^{3} p[x', -1] + 2\right) >> 2 \quad (x, y = 0..3) \quad (29)$$

$$pred_c[x, y] = \left(\sum_{y'=0}^{3} p[-1, y'] + 2\right) >> 2 \quad (x, y = 0..3) \quad (30)$$

$$pred_c[x, y] = 128 \quad (x, y = 0..3) \quad (31)$$

Similarly, in the case of x=4 . . . 7, y=0 . . . 3, prediction image predc [x, y] is generated by using upper side pixel p[x, −1] and left side pixel p[−1, y] which are adjacent (in this example, x=4 . . . 7, y=0 . . . 3). More particularly, in three cases of (i) the case where pixel p[x, −1] exists, (ii) the case where pixel p[x, −1] does not exist and pixel p[−1, y] exists, and (iii) the case where pixel p[x, −1] and pixel p[−1, y] do not both exist, prediction images are respectively generated in accordance with the following formulas (32) to (34).

[18]

$$pred_c[x, y] = \left(\sum_{x'=4}^{7} p[x', -1] + 2\right) >> 2 \quad (x = 4...7, y = 0...3) \quad (32)$$

$$pred_c[x, y] = \left(\sum_{y'=0}^{3} p[-1, y'] + 2\right) >> 2 \quad (x = 4...7, y = 0...3) \quad (33)$$

$$pred_c = 128 \quad (x = 4...7, y = 0...3) \quad (34)$$

Similarly, in the case of x=0 . . . 3, y=4 . . . 7, prediction image predc [x, y] is generated by using upper side pixel p[x, −1] and left side pixel p[−1,y] which are adjacent (in this example, x=0 . . . 3, y=4 . . . 7). More particularly, in three cases of (i) the case where pixel p[−1, y] exists, (ii) the case where pixel p[x, −1] exists and pixel p[−1, y] does not exist, and (iii) the case where pixel p[x, −1] and p[−1, y] do not both exist, prediction images are respectively generated in accordance with the following formulas (35) to (37).

[19]

$$pred_c[x, y] = \left(\sum_{y'=4}^{7} p[-1, y'] + 2\right) >> 2 \quad (x = 0...3, y = 4...7) \quad (35)$$

$$pred_c[x, y] = \left(\sum_{x'=0}^{3} p[x', -1] + 2\right) >> 2 \quad (x = 0...3, y = 4...7) \quad (36)$$

$$pred_c = 128 \quad (x = 0...3, y = 4...7) \quad (37)$$

Similarly, in the case of x, y=4 . . . 7, prediction image predc [x, y] is generated by using upper side pixel p[x, −1] and left side pixel p[−1, y] which are adjacent (in this example, x, y= 4 . . . 7). More particularly, in four cases of (i) the case where pixel p[x, −1] and pixel p[−1, y] both exist, (ii) the case where pixel p[x, −1] exists and pixel p[−1, y] does not exist, (iii) the case where pixel p[x, −1] does not exist and pixel p[−1, y] exists, and (iv) the case where pixel p[x, −1] and pixel p[−1, y] do not both exist, prediction images are respectively generated in accordance with the following formulas (38) to (41).

[20]

$$pred_c[x, y] = \left(\sum_{x'=4}^{7} p[x', -1] + \sum_{y'=4}^{7} p[-1, y'] + 4\right) >> 3 \quad (x, y = 4...7) \quad (38)$$

$$pred_c[x, y] = \left(\sum_{x'=4}^{7} p[x', -1] + 2\right) >> 2 \quad (x, y = 4...7) \quad (39)$$

$$pred_c[x, y] = \left(\sum_{y'=4}^{7} p[-1, y'] + 2\right) >> 2 \quad (x, y = 4...7) \quad (40)$$

$$pred_c[x, y] = 128 \quad (x, y = 4...7) \quad (41)$$

Similarly, in the case of x=0 . . . 3, y=8 . . . 11, prediction image predc [x, y] is generated by using upper side pixel p[x, −1] and left side pixel p[−1, y] which are adjacent (in this example, x=0 . . . 3, y=8 . . . 11). More particularly, in three case of (i) the case where pixel p[−1, y] exists, (ii) the case where pixel p[x, −1] exists and pixel p[−1, y] does not exist, and (iii) the case where pixel p[x, −1] and pixel p[−1, y] do not both exist, prediction images are respectively generated in accordance with the following formulas (42) to (44).

[21]

$$pred_c[x, y] = \left(\sum_{y'=8}^{11} p[-1, y'] + 2\right) >> 2 \quad (x = 0...3, y = 8...11) \quad (42)$$

$$pred_c[x, y] = \left(\sum_{x'=0}^{3} p[x', -1] + 2\right) >> 2 \quad (x = 0...3, y = 8...11) \quad (43)$$

$$pred_c = 128 \quad (x = 0...3, y = 8...11) \quad (44)$$

Similarly, in the case of x=4 . . . 7, y=8 . . . 11, prediction image predc [x, y] is generated by using upper side pixel p[x, −1] and left side pixel p[−1, y] which are adjacent (in this example, x=4 . . . 7, y=8 . . . 11). More particularly, in four cases of (i) the case where pixel p[x, −1] and pixel p[−1, y] both exist, (ii) the case where pixel p[x, −1] exists and pixel p[−1, y] does not exist, (iii) the case where pixel p[x, −1] does not exist and pixel p[−1, y] exists, and (iv) the case where pixel p[x, −1] and pixel p[−1, y] do not both exist, prediction images are respectively generated in accordance with the following formulas (45) to (48).

[22]

$$pred_c[x, y] = \left(\sum_{x'=4}^{7} p[x', -1] + \sum_{y'=8}^{11} p[-1, y'] + 4\right) >> 3 \quad (x = 4 \ldots 7, y = 8 \ldots 11) \quad (45)$$

$$pred_c[x, y] = \left(\sum_{x'=4}^{7} p[x', -1] + 2\right) >> 2 \quad (x = 4 \ldots 7, y = 8 \ldots 11) \quad (46)$$

$$pred_c[x, y] = \left(\sum_{y'=8}^{11} p[-1, y'] + 2\right) >> 2 \quad (x = 4 \ldots 7, y = 8 \ldots 11) \quad (47)$$

$$pred_c[x, y] = 128 \quad (x = 4 \ldots 7, y = 8 \ldots 11) \quad (48)$$

Similarly, in the case of x=0 . . . 3, y=12 . . . 15, prediction image predc [x, y] is generated by using upper side pixel p[x, −1] and left side pixel p[−1, y] which are adjacent (in this example, x=0 . . . 3, y=12 . . . 15). More particularly, in three cases of (i) the case where pixel p[−1, y] exists, (ii) the case where pixel p[x, −1] exists and pixel p[−1, y] does not exist, and (iii) the case where pixel p[x, −1] and pixel p[−1, y] do not both exist, prediction images are respectively generated in accordance with the following formulas (49) to (51)

[23]

$$pred_c[x, y] = \left(\sum_{y'=12}^{15} p[-1, y'] + 2\right) >> 2 \quad (x = 0 \ldots 3, y = 12 \ldots 15) \quad (49)$$

$$pred_c[x, y] = \left(\sum_{x'=0}^{3} p[x', -1] + 2\right) >> 2 \quad (x = 0 \ldots 3, y = 12 \ldots 15) \quad (50)$$

$$pred_c = 128 \quad (x = 0 \ldots 3, y = 12 \ldots 15) \quad (51)$$

Similarly, in the case of x=4 . . . 7, y=12 . . . 15, prediction image predc [x, y] is generated by using upper side pixel p[x, −1] and left side pixel p[−1, y] which are adjacent (in this example, x=4 . . . 7, y=12 . . . 15). More particularly, in four cases of (i) the case where pixel p[x, −1] and pixel [−1, y] both exist, (ii) the case where pixel p[x, −1] exists and pixel p[−1, y] does not exist, (iii) the case where pixel p[x, −1] does not exist and pixel p[−1, y] exists, and (iv) the case where pixel p[x, −1] and pixel p[−1, y] do not both exist, prediction images are respectively generated in accordance with the following formulas (52) to (55).

[24]

$$pred_c[x, y] = \left(\sum_{x'=4}^{7} p[x', -1] + \sum_{y'=12}^{15} p[-1, y'] + 4\right) >> 3 \quad (x = 4 \ldots 7, y = 12 \ldots 15) \quad (52)$$

$$pred_c[x, y] = \left(\sum_{x'=4}^{7} p[x', -1] + 2\right) >> 2 \quad (x = 4 \ldots 7, y = 12 \ldots 15) \quad (53)$$

$$pred_c[x, y] = \left(\sum_{y'=12}^{15} p[-1, y'] + 2\right) >> 2 \quad (x = 4 \ldots 7, y = 12 \ldots 15) \quad (54)$$

$$pred_c[x, y] = 128 \quad (x = 4 \ldots 7, y = 12 \ldots 15) \quad (55)$$

Here, in the above-described prediction method, since mean (average) value of eight pixels of upper side block and 16 pixels of left side block is simply caused to be prediction image, it is necessary to perform division by 24. Thus, there is the problem that operation quantity becomes many. In view of the above, the prediction method is modified in a manner as described below to perform division by 16 (=24), thereby making it possible to reduce operation quantity.

Namely, in the case of x, y=0 . . . 7, prediction image predc [x, y] is generated by using upper side pixel p[x, −1] and left side pixel p[−1, y] which are adjacent (in this example, x, y= 0 . . . 7). More particularly, in four cases of (i) the case where pixel p[x, −1] and pixel p[−1, y] both exist, (ii) the case where pixel p[x, −1] exists and pixel p[−1, y] does not exist, (iii) the case where pixel p[x, −1] does not exist and pixel p[−1, y] exists, and (iv) the case where pixel p[x, −1] and pixel p[−1, y] do not both exist, prediction images are respectively generated in accordance with the following formulas (56) to (59).

[25]

$$pred_c[x, y] = \left(\sum_{x'=0}^{7} p[x', -1] + \sum_{y'=0}^{7} p[-1, y'] + 8\right) >> 4 \quad (x, y = 0 \ldots 7) \quad (56)$$

$$pred_c[x, y] = \left(\sum_{x'=0}^{7} p[x', -1] + 4\right) >> 3 \quad (x, y = 0 \ldots 7) \quad (57)$$

$$pred_c[x, y] = \left(\sum_{y'=0}^{7} p[-1, y'] + 4\right) >> 3 \quad (x, y = 0 \ldots 7) \quad (58)$$

$$pred_c[x, y] = 128 \quad (x, y = 0 \ldots 7) \quad (59)$$

Similarly, in the case of x=0 . . . 7, y=8 . . . 15, prediction image predc [x, y] is generated by using upper side pixel p[x, −1] and left side pixel p[−1, y] which are adjacent (in this example, x=0 . . . 7, y=8 . . . 15). More particularly, in three cases of (i) the case where pixel p[−1, y] exists, (ii) the case where pixel p[x, −1] exists and pixel p[−1, y] does not exist, and (iii) the case where pixel p[x, −1] and pixel p[−1, y] do not both exist, prediction images are respectively generated in accordance with the following formulas (60) to (62).

[26]

$$pred_c[x, y] = \left(\sum_{y'=8}^{15} p[-1, y'] + 4\right) >> 3 \quad (x = 0 \ldots 7, y = 8 \ldots 15) \quad (60)$$

$$pred_c[x, y] = \left(\sum_{x'=0}^{7} p[x', -1] + 4\right) >> 3 \quad (x = 0 \ldots 7, y = 8 \ldots 15) \quad (61)$$

$$pred_c[x, y] = 128 \quad (x = 0 \ldots 7, y = 8 \ldots 15) \quad (62)$$

(d) Plane Prediction Mode (Mode=3)

In the Plane Prediction mode, prediction image is plane-approximated from pixel of left side block and pixel of upper side block which are adjacent of color difference block to allow the prediction image thus obtained to be prediction image of the corresponding block. When pixels of left and upper side blocks which are adjacent are respectively expressed as p[-1, y] and p[x, -1], prediction image predc of color difference in this case is represented by the following formula (63). Here, Clip1 in the formula (63) indicates that clipping is performed into the range from 0 to 255.

[27]

$$pred_c[x,y]=Clip1((a+b\times(x-3)+c\times(y-7)+16)>>5)(x=0\ldots7, y=0\ldots15) \quad (63)$$

where $$\begin{cases} a = 16 \times (p[-1, 15] + p[7, -1]) \\ b = (17 \times H + 16) >> 5 \\ c = (5 \times V + 32) >> 6 \\ H = \sum_{x'=0}^{3} (x' + 1) \times (p[4 + x', -1] - p[2 - x', -1]) \\ V = \sum_{y'=0}^{7} (y' + 1) \times (p[-1, 8 + y'] - p[-1, 6 - y']) \end{cases}$$

(2-1-3)

Subsequently, the operation of the intra predictor 31c will be explained. Also at the intra predictor 31c, four prediction modes of Vertical mode, Horizontal mode, DC mode and Plane prediction mode exist in the intra color difference prediction mode. The intra predictor 31c performs prediction with 16×16 block constituted by collecting four 8×8 blocks in longitudinal and lateral directions successive within macro block being as unit with respect to image signal in which chroma format signal indicates 4:4:4 format and color space signal indicates YCbCr, RGB or XYZ. Techniques of generating prediction images in accordance with respective four prediction modes at the intra predictor 31c will be explained.

(a) Vertical Mode (Mode=0)

In the Vertical mode, pixels of adjacent upper side block of color difference block are copied to allow the pixels thus copied to be prediction image of corresponding block. When pixels of adjacent upper side block are expressed as p[x, -1], prediction image predc of color difference in this case is represented by the following formula (64). It is to be noted that this mode can be used only in the case where adjacent upper side block exists.

[28]

$$pred_c[x,y]=p[x,-1](x,y=0\ldots15) \quad (64)$$

(b) Horizontal Mode (Mode=1)

In the Horizontal mode, pixels of adjacent left side block of color difference block are copied to allow the pixels thus copied to be prediction image of the corresponding block. When pixels of adjacent left side block are expressed as p[-1, y], prediction image predc of color difference block in this case is represented by the following formula (65). It is to be noted that this mode can be used only in the case where adjacent left side block exists.

[29]

$$pred_c[x,y]=p[-1,y](x,y=0\ldots15) \quad (65)$$

(c) DC Mode (Mode=2)

In the DC mode, pixels of upper and lower side blocks which are adjacent of color difference block are used to allow the mean (average) value thereof to be prediction image. It is to be noted that in the case where adjacent pixels do not exist, value 128 is used as prediction signal.

Namely, in the case of x, y=0 . . . 15, prediction image predc p[x, y] is generated by using upper side pixel p[x, -1] and left side pixel p[-1, y] which are adjacent (in this example, x, y= 0 . . . 15). More particularly, in four cases of (i) the case where pixel p[x, -1] and pixel p[-1, y] both exist, (ii) the case where pixel p[x, -1] exists and pixel p[-1, y] does not exist, (iii) the case where pixel p[x, -1] does not exist and pixel p[-1, y] exists, and (iv) the case where pixel p[x, -1] and pixel p[-1, y] do not both exist, prediction images are respectively generated in accordance with the following formulas (66) to (69).

[30]

$$pred_c[x, y] = \left(\sum_{x'=0}^{15} p[x', -1] + \sum_{y'=0}^{15} p[-1, y'] + 16\right) >> 5 \ (x, y = 0..15) \quad (66)$$

$$pred_c[x, y] = \left(\sum_{x'=0}^{15} p[x', -1] + 8\right) >> 4 \ (x, y = 0..15) \quad (67)$$

$$pred_c[x, y] = \left(\sum_{y'=0}^{15} p[-1, y'] + 8\right) >> 4 \ (x, y = 0..15) \quad (68)$$

$$pred_c[x, y] = 128 \ (x, y = 0..15) \quad (69)$$

(d) Plane Prediction Mode (Mode=3)

In the Plane Prediction mode, prediction image is plane-approximated from pixel of left side block and pixel of upper side block which are adjacent of color difference block to allow the prediction image thus obtained to be prediction image of corresponding block. When pixels of left and upper side blocks which are adjacent are respectively expressed as p[-1, y] and p[x, -1], the prediction image predc of color difference in this case is represented by the following formula (70). Here, Clip1 in the formula (70) indicates that clipping into the range from 0 to 255 is performed.

[31]

$$pred_c[x,y]=Clip1((a+b\times(x-7)+c\times(y-7)+16)>>5)(x,y=0\ldots15) \quad (70)$$

where $$\begin{cases} a = 16 \times (p[-1, 15] + p[15, -1]) \\ b = (5 \times H + 32) >> 6 \\ c = (5 \times V + 32) >> 6 \\ H = \sum_{x'=0}^{7} (x' + 1) \times (p[8 + x', -1] - p[6 - x', -1]) \\ V = \sum_{y'=0}^{7} (y' + 1) \times (p[-1, 8 + y'] - p[-1, 6 - y']) \end{cases}$$

(2-2) Orthogonal Transform Unit

Chroma format signal and color space signal are also delivered to the orthogonal transform unit 14.

Figure 7:
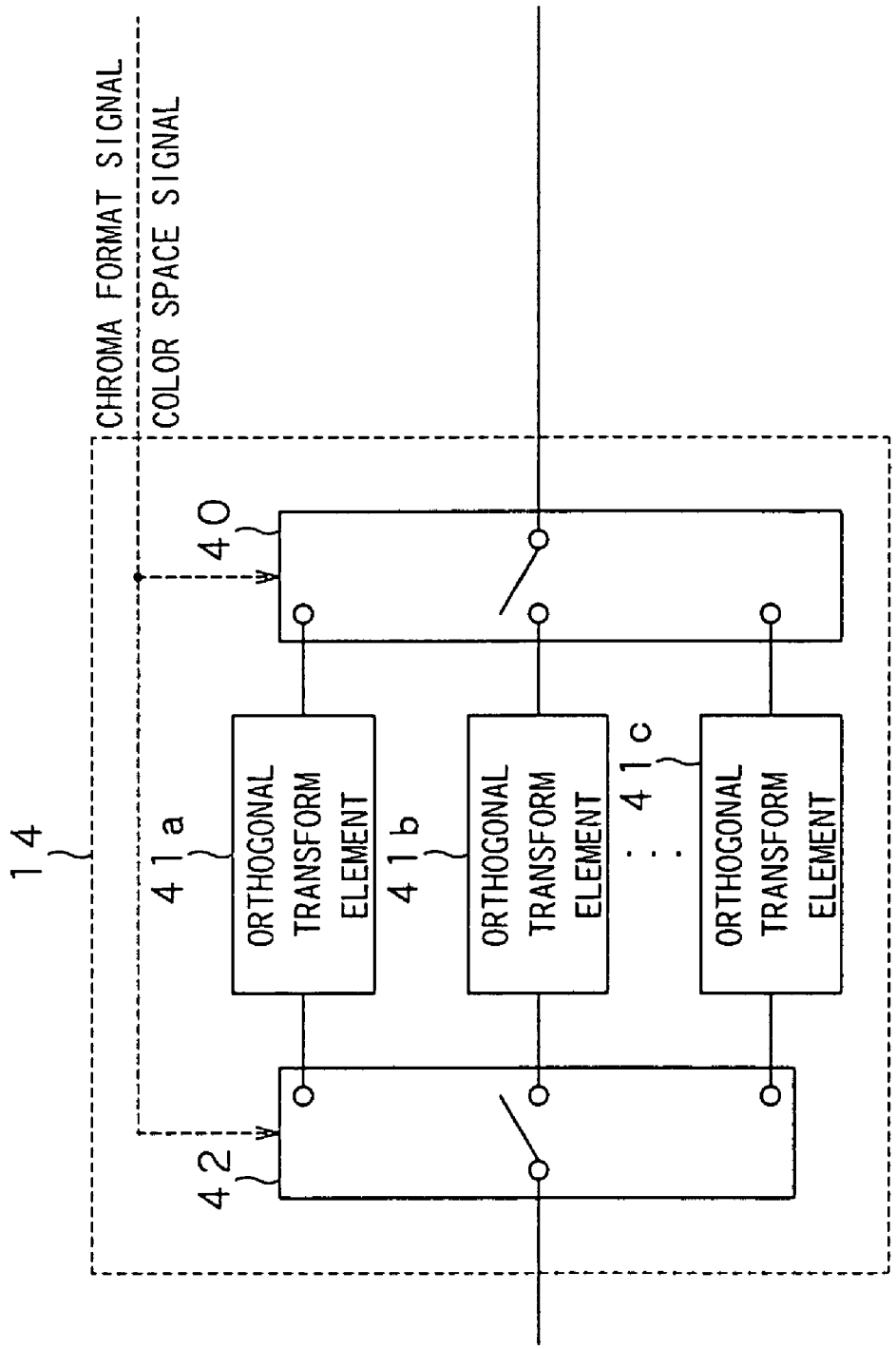
FIG. 7 is a view showing one example of the configuration of orthogonal transform unit in the image information encoding apparatus according to the present invention.

One example of the configuration of the orthogonal transform unit 14 is shown in FIG. 7. The orthogonal transform unit 14 switches orthogonal transform system on the basis of chroma format signal indicating whether resolution of color component is that of any one of the 4:2:0 format, the 4:2:2 format and the 4:4:4 format, etc., and color space signal indicating whether color space is any one of YCbCr, RGB and XYZ, etc.

At the orthogonal transform unit 14 shown in FIG. 7, the chroma format signal and the color space signal are delivered to switches 40, 42. The switches 40, 42 select any one of orthogonal transform elements 41*a*, 41*b*, 41*c* on the basis of the chroma format signal and the color space signal to deliver output from the adder 13 to the selected orthogonal transform element to output a signal from the selected orthogonal transform element. The switches 40, 42 select the same orthogonal transform element. It is to be noted that while explanation will be given in FIG. 7 on the premise that any one of three kinds of orthogonal transform elements 41*a*, 41*b*, 41*c* is selected, the number of orthogonal transform elements, i.e., the number of orthogonal transform systems may be arbitrarily set.

(2-2-1)

First, the operation of the orthogonal transform element 41*a* will be explained. The orthogonal transform element 41*a* performs orthogonal transform with respect to an image signal in which chroma format signal indicates 4:2:0 format and color space signal indicates YCbCr. It is to be noted that since the operation of the orthogonal transform element 41*a* is the same as that of the previously described prior art, the detailed explanation thereof is omitted.

(2-2-2)

Then, the operation of the orthogonal transform element 41*b* will be explained. The orthogonal transform element 41*b* performs orthogonal transform with respect to an image signal in which chroma format signal indicates 4:2:2 format and color space signal indicates YCbCr.

More particularly, after intra-prediction of color difference is performed, 4×4 integral transform is applied on 4×4 pixel block basis within 8×8 blocks. When difference signal obtained by subtracting prediction image from corresponding pixel block is expressed as f4×4, 4×4 orthogonal transform processing is represented by the following formula (71).

[32]

$$f_{4\times4}=T_{4\times4}\times F_{4\times4}\times T_{4\times4}^T \quad (71)$$

where $$T_{4\times4} = \begin{pmatrix} 1 & 1 & 1 & 1 \\ 2 & 1 & -1 & -2 \\ 1 & -1 & -1 & 1 \\ 1 & -2 & 2 & -1 \end{pmatrix}$$

After 4×4 integral transform processing is performed, (0, 0) coefficients of eight 4×4 blocks within two 8×8 blocks successive in a longitudinal direction are collected to constitute 2×4 block to apply 2×4 transform processing to the 2×4 block. This is because efficiency of intra-prediction used in color difference is not so high so that correlation is still left between (0, 0) coefficients of adjacent 4×4 blocks. In order to further enhance (increase) encoding efficiency by making use of the correlation, only (0, 0) coefficients of 4×4 blocks are collected to constitute 2×4 blocks to apply 2×4 transform processing thereto. When block of chroma DC of 2×4 is expressed as fdc2×4, transform processing with respect to the chroma DC block is represented by the following formula (72).

[33]

$$fdc'_{2\times4}=T_{v(4)}\times fdc_{2\times4}\times T_{h(2)}^T \quad (72)$$

where $$T_{v(4)} = \begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

$$T_{h(2)} = \begin{pmatrix} 1 & 1 \\ 1 & -1 \end{pmatrix}$$

(2-2-3)

Subsequently, the operation of the orthogonal transform element 41*c* will be explained. The orthogonal transform element 41*c* performs orthogonal transform with respect to an image signal in which chroma format signal indicates 4:4:4 format and color space signal indicates YCbCr, RGB or XYZ.

More particularly, 4×4 integral transform of color difference indicating 4:4:4 format, YCbCr, RGB or XYZ is performed thereafter to collect 16 (0, 0) coefficients within macro block in the same manner as the case of luminance to constitute 4×4 DC block to apply 4×4 transform processing thereto. This transform processing is represented by the following formula (73).

[34]

$$fdc'_{4\times4}=T_{4\times4}\times fdc_{4\times4}\times T_{4\times4}^T \quad (73)$$

where $$T_{4\times4} = \begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

(2-3) Quantization Unit

Chroma format signal and color space signal are also delivered to the quantization unit 15.

Figure 9:
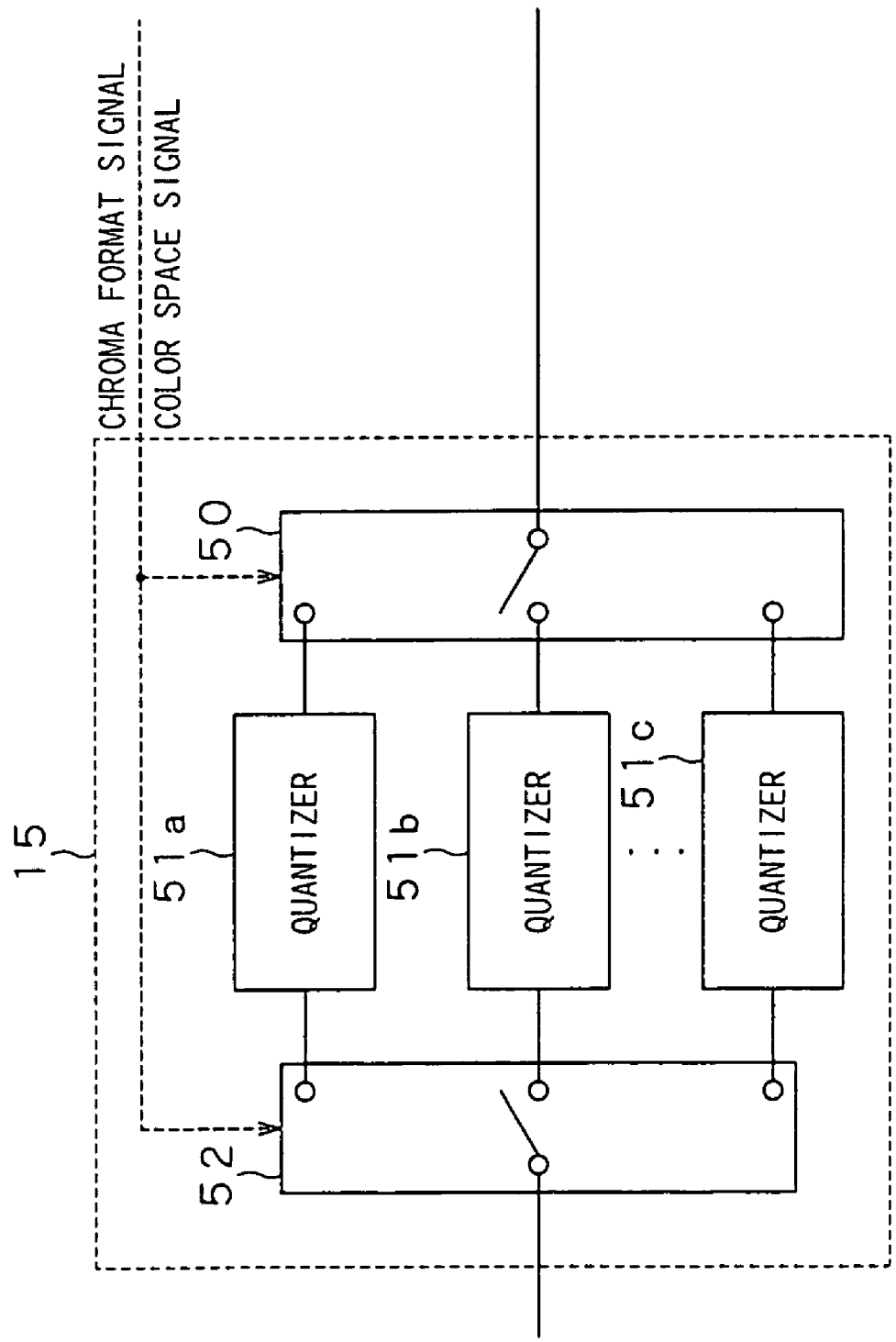
FIG. 9 is a block diagram showing one example of the configuration of quantization unit in the image information encoding apparatus according to the present invention.

An example of the configuration of the quantization unit 15 is shown in FIG. 9. The quantization unit 15 switches quantization system on the basis of chroma format signal indicating whether resolution of color component is that of any one of 4:2:0 format, 4:2:2 format and 4:4:4 format, etc. and color space signal indicating whether color space is any one of YCbCr, RGB and XYZ, etc.

At the quantization unit 15 shown in FIG. 9, chroma format signal and color space signal are delivered to switches 50, 52. The switches 50, 52 select any one of quantizers 51*a*, 51*b*, 51*c* on the basis of chroma format signal and color space signal to deliver an output from the orthogonal transform unit 14 to the selected quantizer to output a signal from the selected quantizer. The switches 50, 52 select the same quantizer. It is to be noted that while explanation will be given in FIG. 9 on the premise that any one of three kinds of quantizers 51*a*, 51*b*, 51*c* is selected, the number of quantizers, i.e., the number of quantization systems may be arbitrarily set.

(2-3-1)

First, the operation of the quantizer 51*a* will be explained. The quantizer 51*a* performs quantization with respect to an image signal in which chroma format signal indicates 4:2:0 format and color space signal indicates YCbCr. It is to be noted that since the operation of the quantizer 51*a* is the same as that of the previously described prior art, the detailed explanation thereof is omitted.

(2-3-2)

Then, the operation of the quantizer 51b will be explained. The quantizer 51b performs quantization with respect to an image signal in which chroma format signal indicates 4:2:2 format and color space signal indicates YCbCr.

Here, Hadamard transform used in transform processing of chroma DC in the case of 4:2:0 format is represented by the following formula (74).

[35]

$$fdc'_{2\times 4} = T_2 \times fdc_{2\times 2} \times T_2^T \quad (74)$$
$$= \frac{1}{2}\begin{pmatrix} 1 & 1 \\ 1 & -1 \end{pmatrix} fdc_{2\times 2} \begin{pmatrix} 1 & 1 \\ 1 & -1 \end{pmatrix}$$

where $$T_2 = \frac{1}{\sqrt{2}}\begin{pmatrix} 1 & 1 \\ 1 & -1 \end{pmatrix}$$

On the other hand, 2×4 transform used in transform processing of chroma DC in the case of 4:2:2 format is represented by the following formula (75).

[36]

$$fdc'_{2\times 4} = T_{v(4)} \times fdc_{2\times 4} \times T_{h(2)}^T \quad (75)$$
$$= \frac{1}{2\sqrt{2}}\begin{pmatrix} 1 & 1 & 1 & 1 \\ 1 & 1 & -1 & -1 \\ 1 & -1 & -1 & 1 \\ 1 & -1 & 1 & -1 \end{pmatrix} f_{2\times 4} \begin{pmatrix} 1 & 1 \\ 1 & -1 \end{pmatrix}$$

where $$T_{v(4)} = \begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

$$T_{h(2)} = \begin{pmatrix} 1 & 1 \\ 1 & -1 \end{pmatrix}$$

Accordingly, normalization coefficient by transform processing in the 4:2:0 format is ½, whereas normalization coefficient by transform processing in the 4:2:2 format is ½√2. However, since real number operation is included in this case, 2×4 transform is simplified as indicated by the following formula (76).

[37]

$$fdc'_{2\times 4} = T_{v(4)} \times fdc_{2\times 4} \times T_{h(2)}^T \quad (76)$$
$$= \frac{1}{2\sqrt{2}}\begin{pmatrix} 1 & 1 & 1 & 1 \\ 1 & 1 & -1 & -1 \\ 1 & -1 & -1 & 1 \\ 1 & -1 & 1 & -1 \end{pmatrix} fdc_{2\times 4} \begin{pmatrix} 1 & 1 \\ 1 & -1 \end{pmatrix}$$

-continued
$$\approx \frac{1}{4}\begin{pmatrix} 1 & 1 & 1 & 1 \\ 1 & 1 & -1 & -1 \\ 1 & -1 & -1 & 1 \\ 1 & -1 & 1 & -1 \end{pmatrix} fdc_{2\times 4} \begin{pmatrix} 1 & 1 \\ 1 & -1 \end{pmatrix}$$

Since the normalization coefficients are calculated together with scale in quantization, it is necessary to change the quantization method in a manner as described below in the case of transform processing of 4:2:2 format.

When quantized DC coefficient is Qf'[ij], quantized coefficient values of 2×4 chroma DC block are given by, e.g., the following formula (77). Here, r in the formula (77) is parameter for changing rounding processing. It is to be noted that since quantization with respect to AC coefficients is the same as that in the case of the 4:2:0 format, the explanation thereof will be omitted.

[38]

$$Qfdc'[i,j]=(fdc'[i,j]\times Q(QP_c\%6,0,0)+r)>>(15+QPc/6)$$
$$(i=0\ldots 1, j=0\ldots 3) \quad (77)$$

(2-3-3)

Subsequently, the operation of the quantizer 51c will be explained. The quantizer 51c performs quantization with respect to an image signal in which chroma format signal indicates 4:4:4 format and color space signal indicates YCbCr, RGB or XYZ.

Here, Hadamard transform used in transform processing of chroma DC is represented by the following formula (78). Accordingly, in this case, the normalization coefficient of transform processing becomes equal to ¼.

[39]

$$fdc'_{4\times 4} = T_4 \times fdc_{4\times 4} \times T_4^T \quad (78)$$
$$= \frac{1}{4}\begin{pmatrix} 1 & 1 & 1 & 1 \\ 1 & 1 & -1 & -1 \\ 1 & -1 & -1 & 1 \\ 1 & -1 & 1 & -1 \end{pmatrix} fdc_{4\times 4} \begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

where $$T_4 = \frac{1}{2}\begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

When quantized DC coefficient is Qf'[i j], quantized coefficient value of 4×4 chroma DC block is given by, e.g., the following formula (79). Here, r in the formula (79) is parameter for changing rounding processing.

[40]

$$Qfdc'[i,j]=(fdc'[i,j]\times Q(QP_c\%6,0,0)+r)>>(15+QP_c/6)$$
$$(i,j=0\ldots 3) \quad (79)$$

(2-4) Inverse Quantization Unit

Chroma format signal and color space signal are also delivered to the inverse quantization unit 18.

Figure 10:
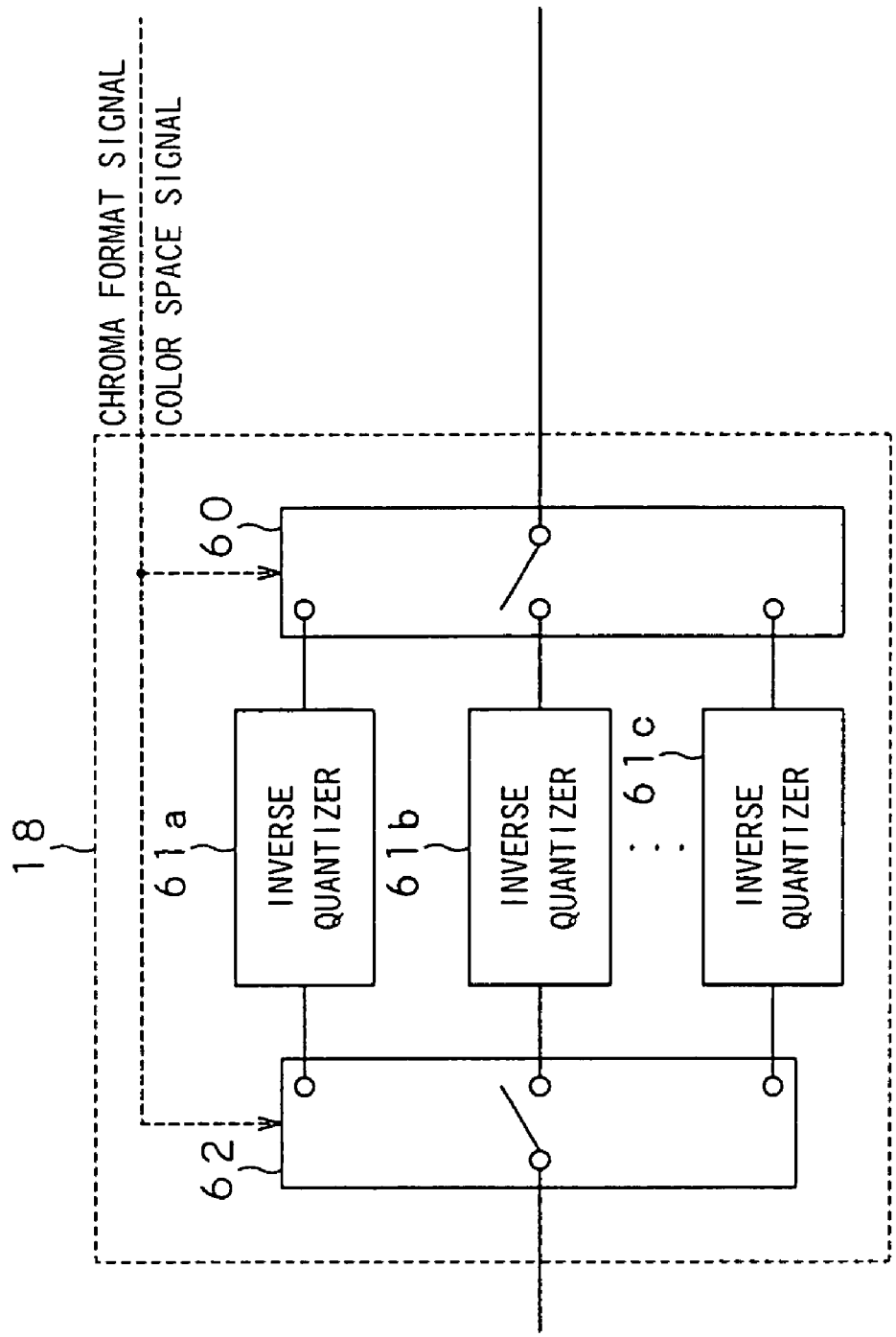
FIG. 10 is a block diagram showing one example of the configuration of inverse-quantization unit in the image information encoding apparatus according to the present invention.

One example of the configuration of the inverse quantization unit 18 is shown in FIG. 10. The inverse quantization unit 18 switches inverse quantization system on the basis of chroma format signal indicating whether resolution of color component is that of any one of 4:2:0 format, 4:2:2 format and 4:4:4 format, etc. and color space signal indicating whether color space is any one of YCbCr, RGB and XYZ, etc.

In the inverse quantization unit 18 shown in FIG. 10, chroma format signal and color space signal are delivered to switches 60, 62. The switches 60, 62 select any one of inverse quantizers 61*a*, 61*b*, 61*c* on the basis of the chroma format signal and the color space signal to deliver output from the quantization unit 15 to the selected inverse-quantizer to output a signal from the selected inverse-quantizer. The switches 60, 62 select the same inverse-quantizer. It is to be noted that while explanation will be given in the FIG. 10 on the premise that any one of three kinds of inverse-quantizers 61*a*, 61*b*, 61*c* is selected, the number of inverse-quantizers, i.e., the number of inverse-quantization systems may be arbitrarily set.

(2-4-1)

First, the operation of the inverse-quantizer 61*a* will be explained. The inverse-quantizer 61*a* performs inverse-quantization with respect to an image signal in which chroma format signal indicates 4:2:0 format and color space signal indicates YCbCr. It is to be noted that since the operation of the inverse-quantizer 61*a* is the same as that of the previously described prior art, the detailed explanation thereof will be omitted.

(2-4-2)

Then, the operation of the inverse-quantizer 61*b* will be explained. The inverse-quantizer 61*b* performs inverse quantization with respect to an image signal in which chroma format signal indicates 4:2:2 format and color space signal indicates YCbCr.

More particularly, when inverse-quantized DC coefficient is fdc", inverse-quantized DC coefficient value of 2×2 chroma DC block is represented by the following formula (80) in the case where QPc is 6 (six) or more, and is represented by the following formula (81) in the case where QPc is less than 6 (six). It is to be noted that since inverse-quantization with respect to AC coefficients is the same as that in the case of 4:2:0 format, the explanation thereof will be omitted.

[41]

$$fdc''[i,j]=(fdc'[i,j] \times Q(QP_c\%6,0,0)) <<(QP_c/6-2)(i=0\ldots1, j=0\ldots3) \quad (80)$$

$$fdc''[i,j]=(fdc'[i,j] \times Q(QP_c\%6, 0, 0)) >>(2-QP_c/6)(i=0\ldots1, j=0\ldots3) \quad (81)$$

(2-4-3)

Then, the operation of the inverse-quantizer 61*c* will be explained. The inverse-quantizer 61*c* performs inverse quantization with respect to an image signal in which chroma format signal indicates 4:4:4 format and color space signal indicates YCbCr, RGB or XYZ.

More particularly, when inverse-quantized DC coefficient is fdc", inverse-quantized coefficient value of 4×4 chroma DC block is represented by the following formula (82) in the case where QPc is 6 (six) or more, and is represented by the following formula (83) in the case where QPc is less than 6 (six). It is to be noted that since inverse quantization with respect to AC coefficients is the same as that in the case of 4:2:0 format, the explanation thereof will be omitted.

[42]

$$fdc''[i,j]=(fdc'[i,j] \times Q(QP_c\%6,0,0)) <<(QP_c/6-2)(i,j=0\ldots3) \quad (82)$$

$$fdc''[i,j]=(fdc'[i,j] \times Q(QP_c\%6,0,0)) >>(2-QP_c/6)(i,j=0\ldots3) \quad (83)$$

(2-5) Inverse Orthogonal Transform Unit

Chroma format signal and color space signal are also delivered to the inverse orthogonal transform unit 19.

Figure 11:
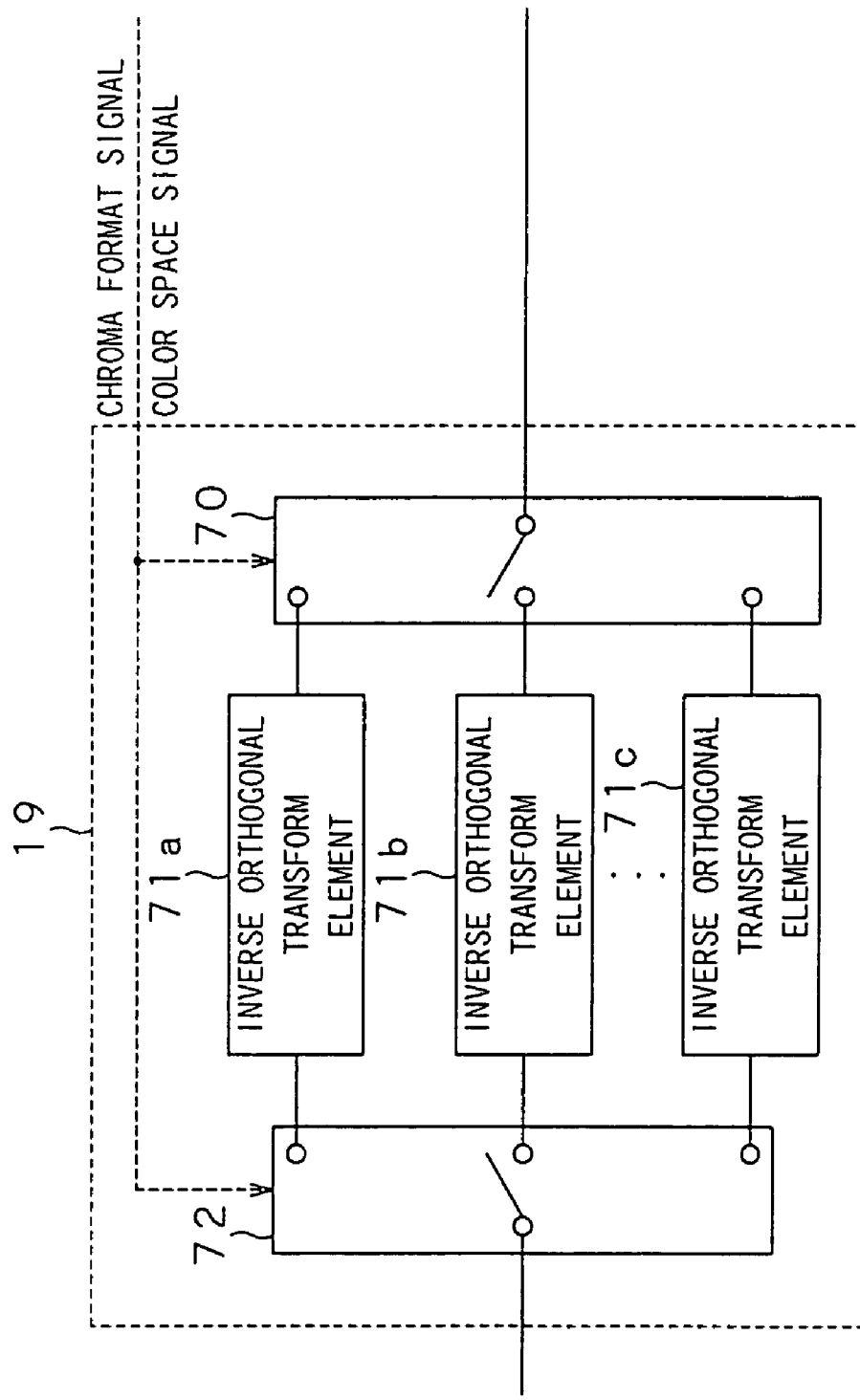
FIG. 11 is a block diagram showing one example of the configuration of inverse-orthogonal transform unit in the image information encoding apparatus according to the present invention.

One example of the configuration of the inverse orthogonal transform unit 19 is shown in FIG. 11. The inverse orthogonal transform unit 19 switches inverse orthogonal transform system on the basis of chroma format signal indicating whether resolution of color component is that of any one of 4:2:0 format, 4:2:2 format and 4:4:4 format, etc. and color space signal indicating whether color space is any one of YCbCr, RGB and XYZ, etc.

In the inverse orthogonal transform unit 19 shown in FIG. 11, chroma format signal and color space signal are delivered to switches 70, 72. The switches 70, 72 select any one of inverse orthogonal transform elements 71*a*, 71*b*, 71*c* on the basis of the chroma format signal and the color space signal to deliver an output from the inverse quantization unit 18 to the selected inverse orthogonal transform element to output a signal from the selected inverse orthogonal transform element. The switches 70, 72 select the same inverse orthogonal transform element. It is to be noted that while explanation will be given in the FIG. 11 on the premise that any one of three kinds of inverse orthogonal transform elements 71*a*, 71*b*, 71*c* is selected, the number of inverse orthogonal transform elements, i.e., the number of inverse orthogonal transform systems may be arbitrarily set.

(2-5-1)

First, the operation of the inverse orthogonal transform element 71*a* will be explained. The inverse-orthogonal transform element 71*a* performs inverse orthogonal transform with respect to an image signal in which chroma format signal indicates 4:2:0 format and color space signal indicates YCbCr. It is to be noted that since the operation of the inverse orthogonal transform element 71*a* is the same as that of the previously described prior art, the detailed explanation thereof will be omitted.

(2-5-2)

Then, the operation of the inverse orthogonal transform element 71*b* will be explained. The inverse orthogonal transform element 71*b* performs inverse orthogonal transform with respect to an image signal in which chroma format signal indicates 4:2:2 format and color space signal indicates YCbCr.

More particularly, 2×4 inverse transform processing is applied to 2×4DC block. When inverse-transformed 2×4 chroma DC block is expressed as fdc2×4''', inverse transform with respect to the chroma DC block is represented by the following formula (84).

[43]

$$fdc'''_{2 \times 4} = T_{v(4)} \times fdc''_{2 \times 4} \times T_{h(2)}^T \quad (84)$$

where $$T_{v(4)} = \begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

$$T_{h(2)} = \begin{pmatrix} 1 & 1 \\ 1 & -1 \end{pmatrix}$$

Figure 8:
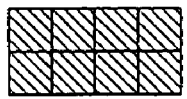
FIG. 8 is a view showing the state where DC coefficients of eight 4×4 blocks within two 8×8 blocks successive in a longitudinal direction are collected to constitute 2×4 blocks.
Figure 8:
Figure 8:
Figure 8:
Figure 8:
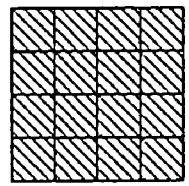
Figure 8:

With the chroma DC coefficient being as (0, 0) coefficients of 4×4 block as shown in FIG. 8, inverse transform processing of respective 4×4 blocks is performed. When respective coefficients of 4×4 blocks in which fdc2×4''' which is inverse-transformed chroma DC is caused to be (0, 0) coefficient are expressed as F'4×4 and decoded difference signal at inverse transformed 4×4 block is expressed as F"4×4, inverse transform processing is represented by the following formula (85).

[44]

$$F''_{4\times4}=t_{4\times4}\times f'_{4\times4}\times t_{4\times4}^T \qquad (85)$$

where $$T_{4\times4}=\begin{pmatrix} 1 & 1 & 1 & 1 \\ 2 & 1 & -1 & -2 \\ 1 & -1 & -1 & 1 \\ 1 & -2 & 2 & -1 \end{pmatrix}$$

(2-5-3)

Subsequently, the operation of the inverse orthogonal transform element 71c will be explained. The inverse orthogonal transform element 71c performs inverse orthogonal transform with respect to an image signal in which chroma format signal indicates 4:4:4 format and color space signal indicates YCbCr, RGB or XYZ.

More particularly, 4×4 inverse transform processing is applied to 4×4 DC blocks. When inverse-transformed 4×4 chroma DC block is expressed as fdc4×4''', inverse transform processing with respect to the chroma DC block is represented by the following formula (86).

[45]

$$fdc'''_{4\times4}=T_4\times fdc''_{4\times4}\times T_4^T \qquad (86)$$

where $$T_4=\begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

With this chroma DC coefficient being as (0, 0) coefficient of 4×4 block of AC coefficients, inverse transform processing of respective 4×4 blocks is performed. When respective coefficients of 4×4 blocks in which fdc4×4''' which is inverse-transformed chroma DC is caused to be (0, 0) coefficient are expressed as F'4×4, and decoded difference signal at inverse-transformed 4×4 block is expressed as F"4×4, inverse transform processing is represented by the following formula (87).

[46]

$$F'''_{4\times4}=T_{4\times4}\times F'_{4\times4}\times T_{4\times4}^T \qquad (87)$$

where $$T_{4\times4}=\begin{pmatrix} 1 & 1 & 1 & 1 \\ 2 & 1 & -1 & -2 \\ 1 & -1 & -1 & 1 \\ 1 & -2 & 2 & -1 \end{pmatrix}$$

(2-6) Other Block

The chroma format signal and the color space signal are also delivered to the reversible encoding unit 16, at which variable length encoding or arithmetic encoding of such signals is performed. The signals thus obtained are outputted in the state included in image compressed information.

The chroma format signal and the color space signal are encoded by, e.g., syntax as described below.

```
seq_parameter_set_rbsp( ) {
    :
    chroma_format_idc    u(2)
    color_space_idc      u(2)
    :
}
```

Here, syntax encoded as u(2) is encoded by variable length code of, e.g., "001×1×0". Among them, x1 and x0 correspond to 2 (two) bits of syntax to be encoded.

(3) Configuration and Operation of the Image Information Decoding Apparatus

Figure 12:
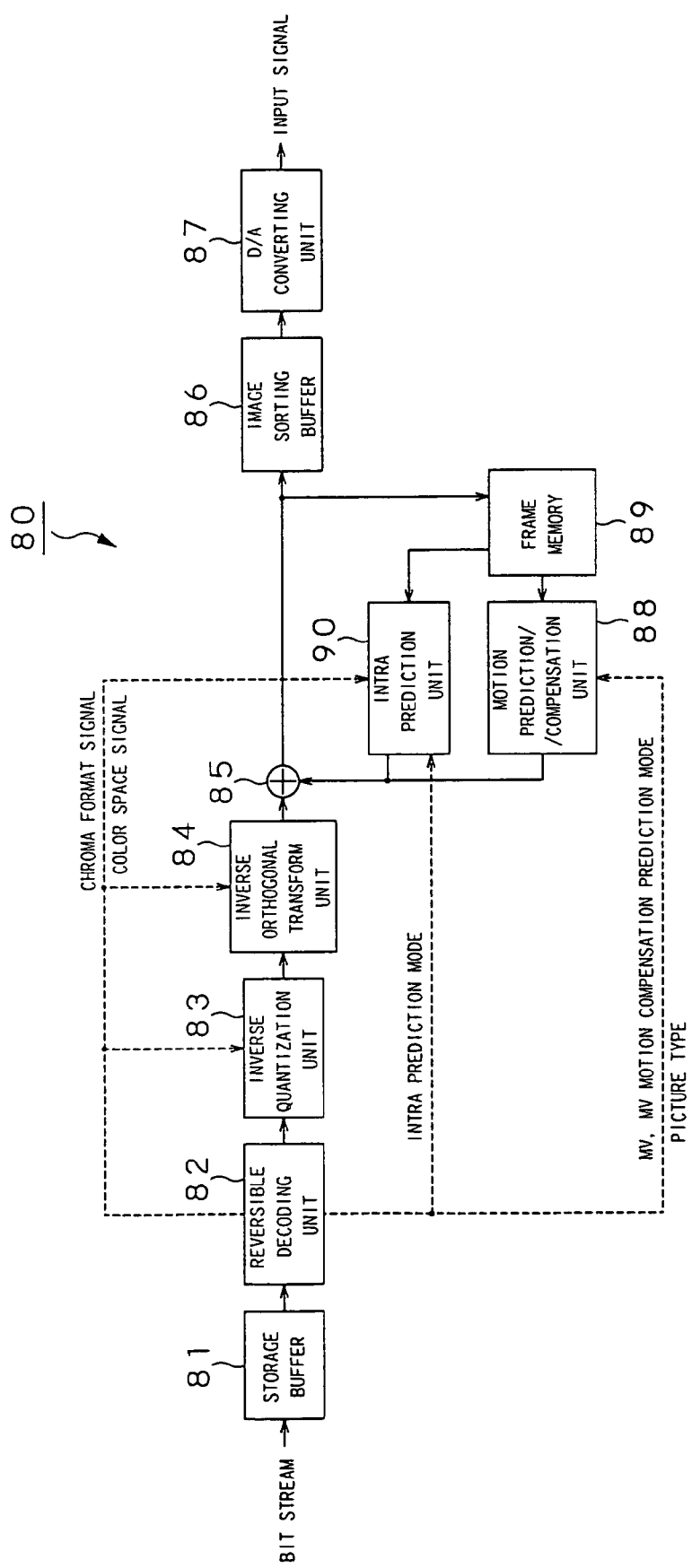
FIG. 12 is a block diagram showing outline of the configuration of an image information decoding apparatus according to the present invention.

Outline of the configuration of an image information decoding apparatus corresponding to the above-described image information encoding apparatus 10 is shown in FIG. 12. As shown in FIG. 12, the image information decoding apparatus 80 comprises a storage buffer 81, a reversible decoding unit 82, an inverse quantization unit 83, an inverse orthogonal transform unit 84, an adder 85, an image sorting buffer 86, a D/A (Digital/Analogue) converting unit 87, a motion prediction/compensation unit 88, a frame memory 89, and an intra prediction unit 90.

In FIG. 12, an image compressed information serving as input is first stored into the storage buffer 81, and is then transferred to the reversible decoding unit 82. The reversible decoding unit 82 performs processing such as variable length decoding or arithmetic decoding, etc. on the basis of a predetermined format for image compressed information. Moreover, in the case where corresponding frame is inter-encoded frame, the reversible decoding unit 82 also decodes motion vector information stored at header portion of the image compressed information to transfer the decoded information thus obtained to the prediction/compensation unit 88. Further, the reversible decoding unit 82 decodes chroma format signal and color space signal to deliver decoded signals thus obtained to the inverse quantization unit 83, the inverse orthogonal transform unit 84 and the intra prediction unit 90.

Quantized transform coefficients serving as output of the reversible decoding unit 82 are delivered to the inverse quantization unit 83, at which they are outputted as transform coefficients. The inverse orthogonal transform unit 84 implements reversible transform such as inverse discrete cosine transform or inverse Karhunen-Loeve transform, etc. to the transform coefficients on the basis of a predetermined format for image compressed information. In the case where corresponding frame is intra-encoded frame, image information to which inverse orthogonal transform processing has been implemented is stored into the image sorting buffer 86, and is outputted after undergone D/A converting processing.

Here, in the case where corresponding frame or macro block is intra-encoded frame or macro block, decoding processing is performed by using the same inverse quantization method, inverse orthogonal transform method and intra prediction method as those as described above on the basis of the chroma format signal and the color space signal which have been decoded at the reversible decoding unit 82.

On the other hand, in the case where corresponding frame is inter-encoded frame, reference image is generated on the basis of motion vector information to which reversible decoding processing has been implemented and image information stored in the frame memory 89. The reference image thus generated and output of the inverse orthogonal transform unit 84 are synthesized at the adder 85. Since other processing are the same as those of intra-encoded frame, the explanation thereof will be omitted.

It is to be noted that while the present invention has been described in accordance with certain preferred embodiments thereof illustrated in the accompanying drawings and described in the above description in detail, it should be understood by those ordinarily skilled in the art that the invention is not limited to embodiments, but various modifications, alternative constructions or equivalents can be implemented without departing from the scope and spirit of the present invention as set forth by appended claims.

Industrial Applicability

The present invention can efficiently perform encoding processing by using intraimage predictive encoding processing not only with respect to the case of input image signal in which corresponding frame is 4:2:0 format and color space is YCbCr, but also with respect to the case of input image signal in which corresponding format is 4:2:2 format or 4:4:4 format, and color space is RGB or XYZ, etc.

The invention claimed is:

1. An image information encoding apparatus for performing orthogonal transformation of an input image signal on a block basis for quantization, the image information encoding apparatus comprising:
   intra-image prediction means for adaptively changing block size used for prediction based on a chroma format signal indicating resolution of a color signal and a color space signal indicating color space for generating a prediction image for the input image signal;
   transformation means for performing, on a predetermined block size basis, integral transformation of a difference signal between the prediction image generated by the intra-image prediction means and an original image, and for generating transform coefficients;
   quantization means for adaptively changing quantization technique in accordance with transformation processing by the transformation means to quantize the transform coefficients; and
   encoding means for encoding the quantized transform coefficients, the chroma format signal, and the color space signal;
   wherein the chroma format signal at least includes 4:2:0 format, 4:2:2 format, and 4:4:4 format, and the color space signal at least includes YCbCr, RGB, and XYZ, and
   when the chroma format signal is 4:2:0 format and the color space signal is YCbCr, the intra-image prediction means adaptively changes the block size and generates the prediction image on an 8×8 pixel basis,
   when the chroma format signal is 4:2:2 format and the color space signal is YCbCr, the intra-image prediction means adaptively changes the block size and generates the prediction image on an 8×16 pixel basis in which blocks of 8×8 pixels are arranged in a longitudinal direction, and
   when the chroma format signal is 4:4:4 format and the color space signal is YCbCr, RGB, or XYZ, the intra-image prediction means adaptively changes the block size and generates the prediction image on a 16×16 pixel basis in which blocks of 8×8 pixels are arranged in longitudinal and lateral directions.

2. The image information encoding apparatus as set forth in claim 1, wherein the transformation means further performs integral transformation of blocks constituted by collecting only DC components after undergoing integral transform on the predetermined block size.

3. The image information encoding apparatus as set forth in claim 1, wherein when the chroma format signal is 4:2:0 format and the color space signal is YCbCr, the transformation means performs integral transformation of the difference signal on a 4×4 pixel basis to further perform integral transformation of blocks of 2×2 pixel units constituted by collecting transformed DC components.

4. The image information encoding apparatus as set forth in claim 1, wherein when respective coefficients of the blocks of 2×2 pixel units are expressed as fdc2×2, respective coefficients fdc'2×2, after undergoing integral transformation of the corresponding blocks, are represented by the following formula:

$$fdc'_{2\times 2} = T_2 \times fdc_{2\times 2} \times T_2^T$$
$$= \frac{1}{2}\begin{pmatrix} 1 & 1 \\ 1 & -1 \end{pmatrix} fdc_{2\times 2} \begin{pmatrix} 1 & 1 \\ 1 & -1 \end{pmatrix}$$

where $$T_2 = \frac{1}{\sqrt{2}}\begin{pmatrix} 1 & 1 \\ 1 & -1 \end{pmatrix}.$$

5. The image information encoding apparatus as set forth in claim 1, wherein when the chroma format signal is 4:2:2 format and the color space signal is YCbCr, the transformation means performs integral transformation of the difference signal on a 4×4 pixel basis to further perform integral transformation of blocks of 2×4 pixel units constituted by collecting transformed DC components.

6. The image information encoding apparatus as set forth in claim 5, wherein when respective coefficients of the blocks of 2×4 pixel units are expressed as fdc2×4, respective coefficients fdc'2×4, after undergoing integral transformation of the corresponding blocks, are represented by the following formula:

$$fdc'_{2\times 4} = T_{v(4)} \times fdc_{2\times 4} \times T_{h(2)}^T$$
$$= \frac{1}{2\sqrt{2}}\begin{pmatrix} 1 & 1 & 1 & 1 \\ 1 & 1 & -1 & -1 \\ 1 & -1 & -1 & 1 \\ 1 & -1 & 1 & -1 \end{pmatrix} fdc_{2\times 4} \begin{pmatrix} 1 & 1 \\ 1 & -1 \end{pmatrix}$$

where $$T_{v(4)} = \begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

$$T_{h(2)} = \begin{pmatrix} 1 & 1 \\ 1 & -1 \end{pmatrix}.$$

7. The image information encoding apparatus as set forth in claim 6, wherein the relationship between the fdc2×4 and the fdc'2×4 is approximated by the following formula:

$$fdc'_{2\times 4} = T_{v(4)} \times fdc_{2\times 4} \times T_{h(2)}^T$$

-continued $$= \frac{1}{2\sqrt{2}} \begin{pmatrix} 1 & 1 & 1 & 1 \\ 1 & 1 & -1 & -1 \\ 1 & -1 & -1 & 1 \\ 1 & -1 & 1 & -1 \end{pmatrix} fdc_{2\times 4} \begin{pmatrix} 1 & 1 \\ 1 & -1 \end{pmatrix}$$

$$\approx \frac{1}{4} \begin{pmatrix} 1 & 1 & 1 & 1 \\ 1 & 1 & -1 & -1 \\ 1 & -1 & -1 & 1 \\ 1 & -1 & 1 & -1 \end{pmatrix} fdc_{2\times 4} \begin{pmatrix} 1 & 1 \\ 1 & -1 \end{pmatrix}.$$

8. The image information encoding apparatus as set forth in claim 1, wherein in the case where the chroma format signal is 4:4:4 format and the color space signal is YCbCr, RGB, or XYZ, the transformation means performs integral transformation of the difference signal on a 4×4 pixel basis to further perform integral transformation of blocks of 4×4 pixel units constituted by collecting transformed DC components.

9. The image information encoding apparatus as set forth in claim 8, wherein when respective coefficients of the blocks of 4×4 pixel units are expressed as fdc4×4, respective coefficients fdc'4×4, after undergoing integral transformation of the corresponding blocks, are represented by the following formula:

$$fdc'_{4\times 4} = T_4 \times fdc_{4\times 4} \times T_4^T$$

$$= \frac{1}{4} \begin{pmatrix} 1 & 1 & 1 & 1 \\ 1 & 1 & -1 & -1 \\ 1 & -1 & -1 & 1 \\ 1 & -1 & 1 & -1 \end{pmatrix} fdc_{4\times 4} \begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

where $$T_4 = \frac{1}{2} \begin{pmatrix} 1 & 1 & 1 & 1 \\ 1 & 1 & -1 & -1 \\ 1 & -1 & -1 & 1 \\ 1 & -1 & 1 & -1 \end{pmatrix}.$$

10. An image information encoding method for performing orthogonal transformation on a block basis for quantization, the image information encoding method including:
   adaptively changing block size used for prediction based on a chroma format signal indicating resolution of a color signal and a color space signal indicating color space to generate a prediction image of an input image signal;
   performing, on a predetermined block size basis, integral transformation processing of a difference signal between the prediction image and an original image;
   generating transform coefficients;
   adaptively changing a quantization technique in accordance with the transformation processing to quantize the transform coefficients; and
   encoding the quantized transform coefficients, the chroma format signal, and the color space signal;
   wherein the chroma format signal at least includes 4:2:0 format, 4:2:2 format, and 4:4:4 format, and the color space signal at least includes YCbCr, RGB, and XYZ, and
   when the chroma format signal is 4:2:0 format and the color space signal is YCbCr, the block size is adaptively changed and the prediction image is generated on an 8×8 pixel basis,
   when the chroma format signal is 4:2:2 format and the color space signal is YCbCr, the block size is adaptively changed and the prediction image is generated on an 8×16 pixel basis in which blocks of 8×8 pixels are arranged in a longitudinal direction, and
   when the chroma format signal is 4:4:4 format and the color space signal is YCbCr, RGB, or XYZ, the block size is adaptively changed and the prediction image is generated on a 16×16 pixel basis in which blocks of 8×8 pixels are arranged in longitudinal and lateral directions.

11. The image information encoding method as set forth in claim 10, further comprising:
   integral transforming of blocks constituted by collecting only DC components after undergoing integral transformation on the predetermined block size.

\* \* \* \* \*

UNITED STATES PATENT AND TRADEMARK OFFICE
CERTIFICATE OF CORRECTION

PATENT NO.         : 7,492,950 B2
APPLICATION NO.    : 10/527922
DATED              : February 17, 2009
INVENTOR(S)        : Teruhiko Suzuki et al.

It is certified that error appears in the above-identified patent and that said Letters Patent is hereby corrected as shown below:

On the title page, item (74), line 2, "Fararbow," should read --Farabow,--.

Signed and Sealed this

Seventeenth Day of November, 2009

David J. Kappos
*Director of the United States Patent and Trademark Office*